(12) United States Patent
Akerman

(10) Patent No.: US 8,256,377 B2
(45) Date of Patent: *Sep. 4, 2012

(54) MILK SAMPLING AND TESTING

(76) Inventor: David Eric Akerman, Wiltshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/015,856

(22) Filed: Jan. 28, 2011

(65) Prior Publication Data

US 2011/0132264 A1 Jun. 9, 2011

Related U.S. Application Data

(62) Division of application No. 10/570,079, filed as application No. PCT/GB2004/003625 on Aug. 25, 2004, now Pat. No. 7,882,801.

(30) Foreign Application Priority Data

| Aug. 29, 2003 | (GB) | 0320330.4 |
| Aug. 29, 2003 | (GB) | 0320331.2 |
| Aug. 29, 2003 | (GB) | 0320332.0 |

(51) Int. Cl.
*A01J 5/007* (2006.01)
*A01J 5/013* (2006.01)

(52) U.S. Cl. .................. 119/14.02; 119/14.14

(58) Field of Classification Search ............... 119/14.01, 119/14.02, 14.14, 14.15, 14.16, 14.17
See application file for complete search history.

(56) References Cited

U.S. PATENT DOCUMENTS

| 3,557,758 A * | 1/1971 | Lack .................... 119/51.02 |
| 3,841,756 A | 10/1974 | Grochowicz |
| 4,325,028 A | 4/1982 | Takahashi |
| 4,532,892 A * | 8/1985 | Kuzara .................... 119/51.02 |
| 5,572,946 A | 11/1996 | Holroyd |
| 5,645,012 A * | 7/1997 | Hoefelmayr ............... 119/14.14 |
| 5,704,311 A * | 1/1998 | van den Berg ............. 119/14.02 |
| 5,743,209 A | 4/1998 | Bazin et al. |
| 5,823,134 A | 10/1998 | van den Berg |
| 5,873,323 A * | 2/1999 | van den Berg et al. ..... 119/14.02 |
| 5,996,529 A | 12/1999 | Sissom et al. |
| 6,371,046 B1 | 4/2002 | Petterson et al. |
| 6,405,672 B1* | 6/2002 | De Mol et al. ............. 119/14.15 |

(Continued)

FOREIGN PATENT DOCUMENTS

EP 0 564 023 A1 10/1993

(Continued)

OTHER PUBLICATIONS

Rang, H.P., et al., "Pharmacology," 2d Ed., published by Churchill Livingstone, Edinburgh and New York, (1991) pp. 65-67, including three hand typed pages of text.

(Continued)

*Primary Examiner* — David Parsley
(74) *Attorney, Agent, or Firm* — Gifford, Krass, Sprinkle, Anderson & Citkowski, P.C.

(57) ABSTRACT

A method of collecting a sample of milk while milking a succession of animals comprises diverting a portion of milk from an animal into a flowpath leading to an extraction point. The flowpath is dimensioned such that milk flows along the flowpath as a plug occupying the whole of its cross-section and allows some of the milk from the animal to pass the extraction point. Thereafter the milk is transferred into a container or other receiver and at least some of the remaining milk of that animal reaching the extraction point.

14 Claims, 18 Drawing Sheets

U.S. PATENT DOCUMENTS

| | | |
|---|---|---|
| 6,493,071 B2 | 12/2002 | van den Berg et al. |
| 6,694,830 B2 * | 2/2004 | Hakes .................. 73/863.53 |
| 6,793,624 B2 | 9/2004 | Tsenkova |
| 6,814,025 B2 * | 11/2004 | Chen et al. .............. 119/14.01 |
| 7,234,414 B2 * | 6/2007 | Claycomb et al. ........ 119/14.02 |
| 7,296,535 B2 * | 11/2007 | Ornerfors .............. 119/14.02 |
| 7,882,801 B2 * | 2/2011 | Akerman ............... 119/14.02 |
| 2004/0168643 A1 * | 9/2004 | Nilsson ................. 119/14.02 |
| 2004/0194712 A1 | 10/2004 | Johannesson et al. |
| 2006/0283269 A1 | 12/2006 | Anderson et al. |

FOREIGN PATENT DOCUMENTS

| | | |
|---|---|---|
| JP | 60 022664 | 8/1980 |
| WO | WO-01/14580 | 3/2001 |
| WO | WO-01/27631 | 4/2001 |
| WO | WO-2004/057305 | 7/2004 |

OTHER PUBLICATIONS

Hillerton, J.E., "Detecting Mastitis Cow-side," National Mastitis Council Annual Meeting Proceedings, (2000).

* cited by examiner

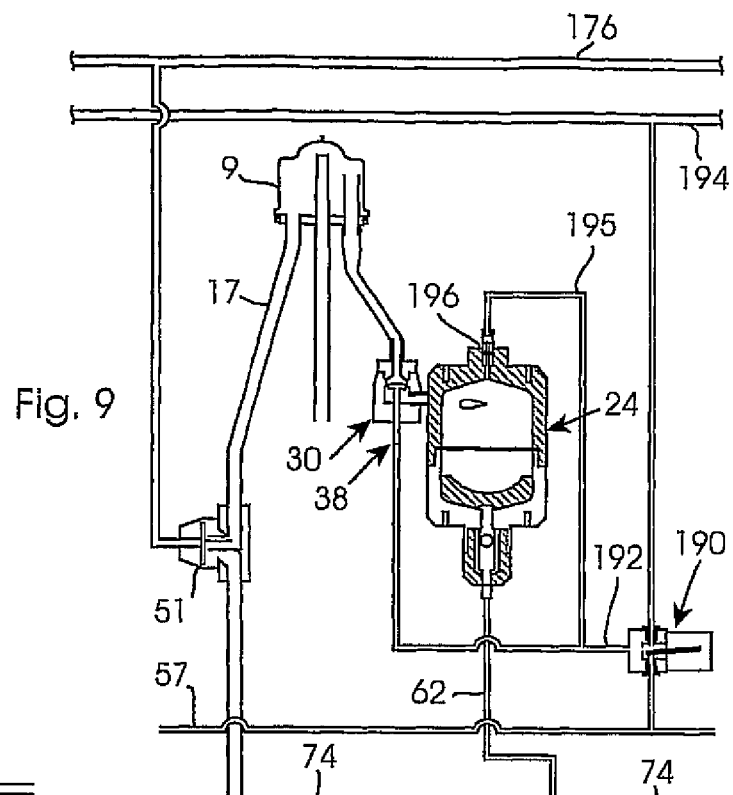
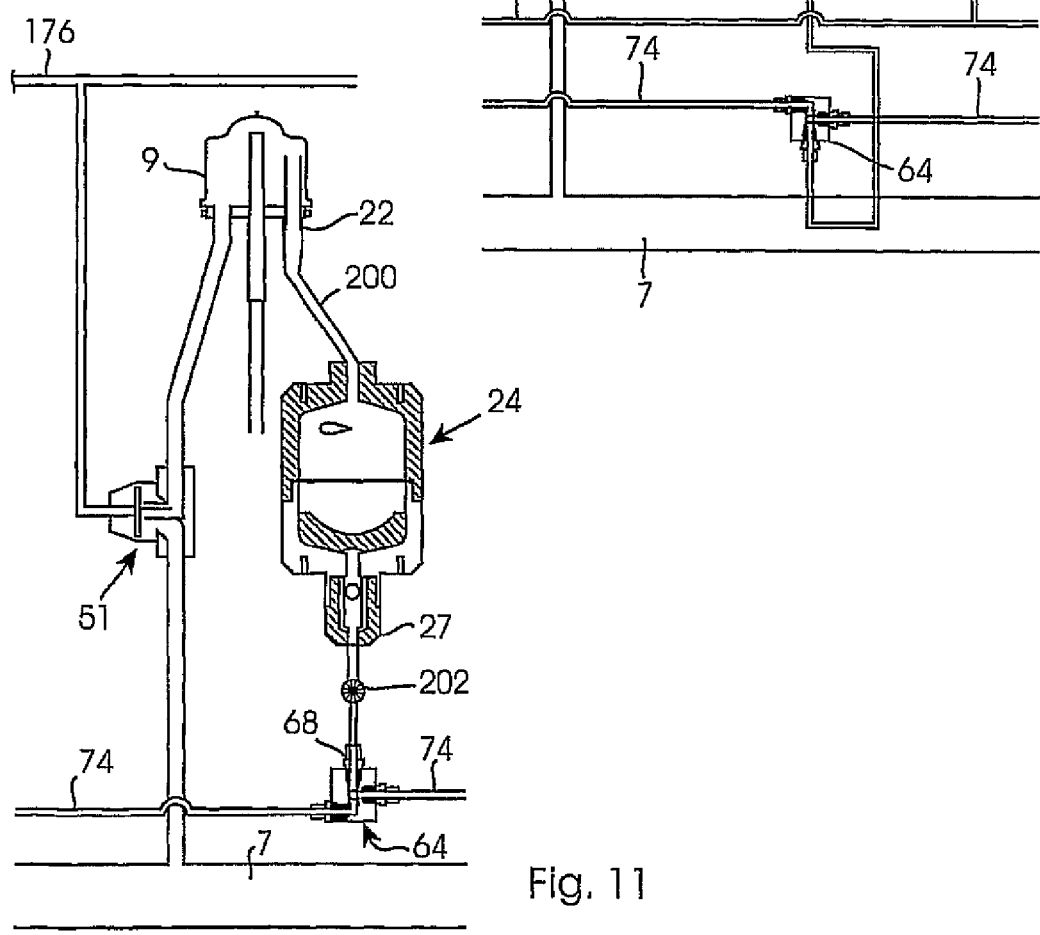
Fig. 9
Fig. 11

| R1 | 1 | 2 | 3 | 4 | 5 | 6 | 7 | 8 |
|---|---|---|---|---|---|---|---|---|
| R2 | 9 | 10 | 11 | 12 | 13 | 14 | 15 | 16 |
| R3 | 17 | 18 | 19 | 20 | 21 | 22 | 23 | 24 |
| R4 | 25 | 26 | 27 | 28 | 29 | 30 | 31 | 32 |
| R5 | 33 | 34 | 35 | 36 | 37 | 38 | 39 | 40 |
| R6 | 41 | 42 | 43 | 44 | 45 | 46 | 47 | 48 |
| R7 | 49 | 50 | 51 | 52 | 53 | 54 | 55 | 56 |
| R8 | 57 | 58 | 59 | 60 | 61 | 62 | 63 | 64 |
|    | C1 | C2 | C3 | C4 | C5 | C6 | C7 | C8 |

| | C1 | C2 | C3 | C4 |
|---|---|---|---|---|
| R1 | 1 | 2 | 3 | 4 |
| R2 | 5 | 6 | 7 | 8 |
| R3 | 9 | 10 | 11 | 12 |
| R4 | 13 | 14 | 15 | 16 |

V2

| | C1 | C2 | C3 | C4 |
|---|---|---|---|---|
| R1 | 17 | 18 | 19 | 20 |
| R2 | 21 | 22 | 23 | 24 |
| R3 | 25 | 26 | 27 | 28 |
| R4 | 29 | 30 | 31 | 32 |

V3

| | C1 | C2 | C3 | C4 |
|---|---|---|---|---|
| R1 | 33 | 34 | 35 | 36 |
| R2 | 37 | 38 | 39 | 40 |
| R3 | 41 | 42 | 43 | 44 |
| R4 | 45 | 46 | 47 | 48 |

V4

| | C1 | C2 | C3 | C4 |
|---|---|---|---|---|
| R1 | 49 | 50 | 51 | 52 |
| R2 | 53 | 54 | 55 | 56 |
| R3 | 41 | 42 | 43 | 60 |
| R4 | 61 | 62 | 63 | 64 |

MILK SAMPLING AND TESTING

CROSS-REFERENCE TO RELATED APPLICATIONS

This application is a divisional of U.S. patent application Ser. No. 10/570,079 filed Jan. 11, 2007, which is a 371 of PCT/GB2004/03625 filed Aug. 25, 2004, which claims priority of GB Patent Application Nos. 0320330.4, 0320331.2, and 0320332.0 filed Aug. 29, 2003.

FIELD OF THE INVENTION

This invention relates to the collection of milk samples while cattle are being milked.

BACKGROUND OF THE INVENTION

In the past, it has been the practice to milk a cow into a receptacle (typically a very large glass jar) allowing the milk yield from the cow to be observed before the milk is transferred to a bulk tank. Currently it has been more usual for the milk to go directly into a suction line which is a pipe of substantial diameter, often over 50 mm diameter, and which extends through the milking parlour and conveys the milk to a bulk tank (so-called direct-to-line milking). When this is done, the milk from a cow may be passed through a milk meter in order to check the milk yield from the cow. This may be done at intervals, perhaps every two weeks, or may be done more frequently, even at every milking.

A milk meter incorporates provision for taking a sample of the flow of milk. The sample is taken as a proportion of the milk as it is coming from the cow so that the sample which is collected should match the overall composition of the milk from the cow even though the composition changes progressively during milking with most of the butter fat coming in the later stages of milking. It is possible to take a sample of the milk at every milking and this is done in research institutions but normal practice in commercial farming is to take samples at intervals. Samples which are taken and sent for analysis are not nearly so large as the samples collected by a milk meter. On days when samples are taken, the task of taking a sample collected by a milk meter, putting a portion of it into a labelled container and putting the remainder back into the collected milk is a substantial addition to the workload.

Milk meters with the facility to collect a sample during milking can be subdivided broadly into manual meters and electronic meters.

Manual milk meters generally operate by dividing the flow of milk from the cow and continuously separating out a fraction of the milk into a sample collecting vessel. The amount which is taken is a fixed proportion of the milk which is flowing from the cow, so the size of the sample which is collected is a known fraction of the total quantity of the milk from the cow, enabling the milk yield of the cow can be calculated from the size of the sample.

Thus, a manual milk meter is actually a device for subdividing the milk flow from a cow and diverting a fixed proportion of that flow to an outlet onto which a sample collecting vessel is attached.

An electronic milk meter is a more elaborate and more expensive device which measures the total weight or total volume of milk from the cow, often by counting how many times the milk fills a space of fixed size. Generally such meters also have the ability to separate out a proportion of the flowing milk into a sample vessel.

Milk meters usually comply with standards laid down by the International Committee for Animal Recording (ICAR). Because of a requirement to obtain a sample with the same composition as the overall milk yield, the sample collecting vessel is typically large enough to hold a sample volume of 0.8 liter. It is normal to take out a small fraction of this relatively large sample for testing and to put the remainder into the bulk tank.

It is possible to take a sample without using a milk meter. Devices are known which can be fitted into the vacuum line from the cluster to the main suction pipe and which will take out a small sample. Such a sample may be less representative of the overall composition of the milk than a (larger) sample taken with a milk meter meeting the ICAR standard.

Depending on the purpose for which the sample is taken, it may not matter whether its composition is representative of the overall composition of the milk from the cow. Analysis of the butter fat content requires the composition of the sample to be a good match to the composition of the overall milk yield, because butter fat is concentrated in the later portions of the milk taken from a cow during milking. However, other constituents which occur in milk such as hormones may be distributed uniformly through the milk and therefore can be detected in any sample.

Since all the milk from a herd of cattle goes into a bulk tank, there is no necessity to clean out the milking machinery after milking one cow and before milking the next. Consequently a sample of the milk taken from one cow may contain traces of milk from the cow previously milked with the same cluster of teat cups.

After milking a herd of cows the pipework in the milking parlour is normally cleaned by a clean-in-place technique in which washing liquors are circulated through the pipework. Most sample collecting vessels must be detached from the milk meters and cleaned separately.

For many years milking parlours have had a number of cow stalls in which cows are milked concurrently. One significant development in recent years is the robotic milking stall which is often a single stall milking unit. This invention is applicable both to a single stall milking unit, as well as a multi stall milking parlour.

SUMMARY OF THE INVENTION

The present invention seeks to enable the collection of milk samples in a convenient manner and with less manual handling than is often required at present. A further advantage in at least some forms of the invention where manual milk meters are used is facility to clean the apparatus during a clean-in-place routine. Forms of the invention also make it possible to derive a measurement of milk yield without having to observe and write down the volume of a collected sample.

In one aspect this invention provides a method of collecting one or more samples of the milk while milking a succession of cows (or other animals). The method involves taking a portion of the milk flow from a cow and putting this sample of milk into a flowpath leading to an extraction point where a smaller sub-sample is taken out of the milk. This flowpath is chosen so as to have a limited cross-sectional area with the result that the sample quantity of milk flows along the flowpath as a plug which completely fills the cross-section of the pipe or tubing which provides the flowpath. As the milk flows along this flowpath it may well encounter residues of a sample of milk previously taken from another cow. However these residues will mix with the first portion of the milk sample as it travels along the flowpath and they will not become mixed with the entire sample quantity. By contrast, the milk flow in the main suction pipe does not occupy the complete cross-section of the pipe and a space above the flowing milk is occupied by froth and air.

When the flowing sample of milk arrives at the extraction point, an initial part of the sample is allowed to pass the extraction point with nothing taken out of it. A smaller sub-sample is then taken out from the remainder of the sample quantity flowing along the flowpath.

So, in this first aspect the present invention provides a method of collecting a sample of milk while milking a succession of animals comprising diverting a portion of the milk from an animal into a flowpath leading to an extraction point, said flowpath being dimensioned such that milk flows along the flowpath as a plug occupying the whole of its cross-section, allowing some of the milk from the animal to pass the extraction point and thereafter transferring into a container or other receiver at least some of the remaining milk of that animal reaching the extraction point.

The size of pipe suitable to cause the milk to flow as a plug occupying the full cross-section of the pipe is likely to be affected by a number of factors including the nature of the material from which the pipe is made and hence whether it provides a hydrophilic or hydrophobic surface the fat content of the milk and the temperature. I have found that milk will flow as a plug in polytetrafluoroethylene (PTFE) tubing of 6 mm internal diameter using a pressure differential of 2 bar to push the milk plug along the pipe. The required flow in the form of a plug occupying the full cross-section can be more reliably achieved with a smaller diameter of pipe. It may also be helpful to avoid sharp bends and steep declines in the flowpath.

It is generally preferred that the flowpath carrying the milk to the extraction point has a cross-sectional area for the majority or the whole of its length which does not exceed 50 mm$^2$, and more preferably does not exceed 30 or 40 mm$^2$. (30 mm$^2$ corresponds to the internal cross section of round tubing with an internal diameter of approximately 6.2 mm). This limitation on cross-sectional area may apply to the entire length of the flowpath but it is possible that portions of the flowpath constituting only a minority of its length might be of larger cross-sectional area, for example at pipe fittings or within valves, particularly if they are filled from below.

It is envisaged that the flowpath will be of considerable length, probably more than 5 or 10 meters. With a single stall robotic unit the flow path might be shorter, but it is still likely that the flow path will have a length greater than 1 or 2 meters. Thus a flowpath length of at least 1 or 2 meters (and possibly much more) can be foreseen as likely in all circumstances.

Conceivably the milk which is taken out at the milking position could be put immediately into the flowpath so that it flowed along the flowpath at the same time as the cow was being milked. However, in a preferred arrangement the milk is collected in a holding vessel adjacent to the milking position and is discharged into the flowpath after the cow has been milked. An advantage of collecting the milk in a holding vessel before putting it into the flowpath is that any air mixed with the milk can be removed before it is introduced into the flowpath. It is therefore preferred that the holding vessel is under vacuum while the milk is collected in it.

Collecting milk in a holding vessel before putting it into the flowpath has a consequence that the plug of milk in the flowpath can be long and continuous. It is not essential that the milk from one animal flows as a single uninterrupted plug within the flowpath. This may be preferred for the sake of convenience, but a possibility is to interrupt the discharge from the vessel to provide a sequence of plugs with air between them. This could assist in removing residues of milk from the flowpath.

It is particularly envisaged that this invention will be used in conjunction with a milking parlour which has a plurality of milking positions. A holding vessel for a collected quantity of milk would be provided at each milking position. It is conceivable that a separate flowpath could lead from each holding vessel to an extraction point but in a preferred arrangement a single flowpath is shared and holding vessels are discharged one at a time into the flowpath. Thus in a preferred form, the method of the invention comprises diverting some milk from individual animals at different milking positions into respective holding vessels adjacent to those positions, discharging the milk from the holding vessels one at a time into a common flowpath leading to a single extraction point, and allowing a leading portion of the mil from each holding vessel to pass the extraction point before taking a sub-sample from the remainder of the milk from that vessel as it passes the extraction point.

A sub-sample may be taken as a single portion of a plug of milk flowing along the flowpath after a leading portion of the milk from that cow has passed the extraction point. This would be appropriate if the intention was to test for a hormone or some other biological molecule distributed fairly evenly throughput the milk yield from a cow. Alternatively, once the leading portion has gone past the extraction point a sequence of small portions or a continuous small proportion may be taken out of the remainder of the milk from that cow so that the sub-sample which is collected is more representative of the overall composition of the milk from that cow. This may be desirable because butter fat comes later in the milk yield from a cow and also tends to rise to the top whenever the milk is allowed to stand.

A refinement of the procedure includes a step of discarding (preferably by returning to the main flow of milk) the first part of the diverted portion of milk before collecting the remainder of the diverted portion of milk in a holding vessel and subsequently discharging the collected milk into the flowpath. The first part, which is discarded is the part which will be mixed with residues of milk from another cow, even before it arrives at the holding vessel.

After samples of milk have been collected they may be tested for general composition for example butter fat content. They may be tested to assay the concentration of progesterone, where a low concentration indicates that a cow is once again ready to breed, or they may be tested to assay the concentration of a substance indicating a specific condition, most notably tested for amyloid A which is an indicator of mastitis.

This will be discussed in more detail below but a significant feature is that a substance indicating disease can be detectable even when a subsample of milk from the affected cow is diluted with subsamples of milk from other, unaffected cows. It may be attractive to carry out such a biological test on mixed subsamples of milk.

The present invention greatly facilitates obtaining sub-samples of milk for biological testing. Consequently, an aspect of this invention provides a method of collecting and testing samples of milk comprising steps of while milking a number of animals, diverting portions of the milk from individual animals and sending the diverted portions of milk into a flow path leading to an extraction point, said flow path being dimensioned such that milk flows along the flow path as a plug occupying the whole of its cross-section, controlling admission of milk to the flowpath so that diverted portions of milk from individual animals flow in succession along the flowpath to the extraction point, collecting subsamples of milk by allowing some of the milk from each animal to pass the extraction point and thereafter transferring at least one subsample of the remaining milk of that animal into a receptacle forming at least one mixture of subsamples of milk from a plurality of the animals; and testing the mixture for the presence of a substance of interest at a concentration above a threshold value.

The procedure for taking samples of milk in accordance with the method of this invention makes it possible not only to obtain subsamples of milk from an individual cow but to prepare mixtures of subsamples in readiness for biological assay. The delivery of subsamples of milk at the extraction point may be conducted in such a way that test volumes containing mixed subsamples of milk from a plurality of animals are prepared directly. The invention therefore includes a method of collecting controlled mixtures of milk while milking a plurality of animals comprising steps of:

diverting portions of milk from individual animals and sending the diverted portions of milk into a flowpath leading to an extraction point, said flowpath being dimensioned such that milk flows along the flowpath as a plug occupying the whole of its cross-section, controlling admission of milk to the flowpath so that diverted portions of milk from individual animals flow in succession along the flowpath to the extraction point, collecting a plurality of mixed subsamples of milk at the extraction point by allowing some of the portion of milk from each animal to pass the extraction point and thereafter delivering subsamples of the remaining milk of that animal into a plurality of receptacles according to a scheme in which individual receptacles receive subsamples of milk from a plurality of animals.

In further aspects this invention provides apparatus for carrying out the method of the invention. This apparatus may comprise:

means to transfer a portion of the milk from a cow into a flowpath leading from a milking position to an extraction point, which flowpath is dimensioned so that milk flows in it as a plug occupying the whole cross-air section of the flowpath, and a path-determining control valve arrangement (incorporating one or probably more than one control valve) at the extraction point operable to send the whole of the arriving flow of milk past the extraction point or alternatively to direct a sub-sample of the milk into a receiving vessel or other receiver. Suitably, the apparatus will include a controller operating in accordance with the stored program, connected to the control valve arrangement for operating that valve arrangement to direct sub-sample of milk from an animal into a receiving vessel after an initial portion of milk from that animal has traveled past the extraction point.

In one preferred form the invention provides apparatus comprising:

a plurality of holding vessels to collect quantities of milk at respective milking positions a control valve arrangement for each said holding vessel operable to empty the vessel into a flowpath leading to an extraction point, the said flowpath being dimensioned so that milk flows in it as a plug occupying the whole cross-section of the flowpath, at least one sensor to detect milk travelling in the flowpath towards the extraction point a path-determining control valve arrangement at the extraction point selectively operable to divert a portion of the milk arriving along the flowpath into a sample receiving vessel or other receiver, and a controller connected to the sensor and each control valve arrangement.

It is possible that each holding vessel could deliver into its own flowpath leading to the extraction point. However, in a preferred arrangement a plurality of holding vessels deliver through respective valves into a common flowpath leading to the extraction point.

While a holding vessel may be provided as a simple container, a preferred possibility is to construct it with a sump or other chamber for the first milk entering the holding vessel, constructed so as to inhibit that milk (which may well have mixed with residues of milk from another cow) from mixing with the milk which subsequently enters the holding vessel.

Preferably the control valve arrangement for each holding vessel is operable to connect the vessel to vacuum from the milking machinery while a milk is being collected in the vessel. It is then preferred that the pressure above the collected milk in the vessel is raised when it is desired to empty a holding vessel into the flowpath.

It would be possible to use vacuum connected to the flowpath downstream of the extraction point to draw milk along the flowpath while admitting atmospheric air to the holding vessel. However, I have found that it is more convenient to utilise compressed air. Preferably therefore, the control valve arrangement for a holding vessel admits compressed air above the milk in the vessel when discharging the milk into the flowpath. Some of this compressed air will flow into the flowpath after the quantity of milk but at other times the pressure in the flowpath is maintained as a pressure intermediate between the positive pressure of the compressed air supply and the vacuum of the milking machinery. Preferably this intermediate pressure is a super-atmospheric pressure less than the pressure of the compressed air supply.

Valves controlling outflow from the holding vessels can then be passive shuttle valves which are normally maintained closed (thereby retaining milk in the vessels) by the pressure differential between the flowpath and the holding vessels. However, when compressed air is admitted to a holding vessel, raising its pressure above the pressure maintained in the flowpath the valve will be driven open to allow milk to be expelled from the vessel into the flowpath, while closing off the part of the flowpath which is upstream of the valve. The same function could be achieved with a pair of non return valves. Also, the use of an actuated valve rather than a passive valve is not ruled out.

The control valve arrangement associated with each holding vessel preferably includes an air operated valve to open and close the flow path for milk into the vessel. The supply of air to this valve may be controlled by a solenoid operated valve. This use of a solenoid operated valve to control compressed air to actuate another valve controlling milk flow is advantageous because the solenoid operated valve can be located in a position out of the way of water used to clean the milking parlour after milking. It is also economical to use a small solenoid valve for which in turn controls and operates a larger valve.

It is advantageous to use compressed air as a source of positive pressure, rather than a positive displacement pump, because the pressure in the system cannot rise above the pressure delivered by the air compressor even in the event of an unexpected blockage somewhere in the system. Since the compressed air is being used in conjunction with milk, the compressor which is employed should be of a type which is not oil lubricated and it should be located in a clean area so as to maintain cleanliness of the air which is brought into contact with the milk. The use of a pump rather than compressed air to propel the milk along the flowpath is not ruled out, however, especially use of a pump which can propel both liquid and air. A pressure regulation arrangement could be provided to limit the maximum pressure in the system. In one possible form of the invention, a holding vessel at each milking position is maintained under vacuum and milk is expelled from it, when required, by means of a pump.

In other aspects this invention provides a method and apparatus for collecting a sample quantity of milk while milking an animal. The method suitably comprises diverting a portion of the milk flowing from the animal into a holding vessel maintained under vacuum and thereafter admitting compressed air to the holding vessel to discharge the milk from it. The apparatus suitably comprising a holding vessel to receive a portion of milk from milking machinery and a control valve arrangement operable to admit milk to the vessel while placing the vessel under vacuum and alternatively to admit compressed air to the vessel while the contents of the vessel discharges into a flowpath. Such apparatus preferably includes a controller operating in accordance with the stored program to operate the control valve arrangement.

Means provided at a milking position to transfer a portion of the milk into a holding vessel or in some other way send it to the flowpath will generally be some form of flow splitting device. One possibility is the flow divider normally included in a manual milk meter. Such a device can have the unwanted consequence that it causes undesirable fluctuations in the vacuum which is being used to draw milk from the teats of a cow.

According to a feature of this invention an additional valve can be used to isolate such a device when it is not required. Consequently an aspect of this invention provides apparatus connected to milking machinery for extracting a sample from the flowing milk at a milking position, comprising flow splitting means to divert a portion of the milk, which flow splitting means defines an outlet path for the diverted portion of milk and also a main path for the remaining flow of milk connected to a vacuum pipeline of the milking machinery, characterised by provision of a milk flow path bypassing the flow splitting means, with a selectively operable valve to open or close the bypass, thereby allowing flow to bypass the flow splitting means when sample extraction is not required.

There are several types of sensor which can be used to detect the presence of liquid in the flowpath. A convenient form of sensor transmits an ultrasound pulse through the flowpath to a receiver. Such a sensor can detect the presence or absence of liquid in the flowpath by detecting either the change in amplitude of the sound signal received at the sensor or a change in the speed of transmission of the ultrasound signal from its transmitter to its receiver. Alternative possibilities are sensors for other physical properties such as a change in capacitance or a change in light transmission across the flowpath.

As an alternative to a sensor which merely detects the presence or absence of liquid in the pipe which constitutes the flowpath, it would be possible to utilise a sensor which measures the flow of liquid. Flow measuring techniques which do not require obstruction of the flow pipe are known. One possibility which could be used is a so-called mag-meter. For this a portion of the flow path would have to be constructed from an insulating and non-magnetic material which is located in a magnetic field. At the same location two electrodes extend through the pipe wall so as to be in contact with the flowing liquid but not with each other. Flow of the slightly conductive milk past these electrodes within the magnetic field generates a small voltage at the electrodes whose magnitude is proportional to the speed of flow. Whatever type of flow meter is employed, it should be capable of distinguishing between liquid and air. This rules out some turbine meters, but a variable area flow meter could be used as these can be sized to react to the flow of liquid but not to the flow of air. It may be possible to utilise a turbine meter if combined with a liquid sensor. Another alternative is to use two liquid presence sensors set some distance apart which could record both the presence and speed of the flow of milk and therefore obtain a yield measurement.

It is a feature of forms of this invention that a measurement of milk yield can be obtained without requiring an electronic milk meter at every milking position and without having to read and record from a manual meter at every position. In a further aspect, therefore, this invention provides a method of estimating the milk yield of an animal comprising diverting a constant proportion of the milk from the animal into a flowpath dimensioned such that milk flows along the flowpath as a plug occupying the whole of its cross-section, and determining the size of a plug of milk as it travels along the flowpath, as a measure of the milk yield from the animal.

A valve arrangement for separating out a sub-sample at the extraction point needs to take into account the possibility that the flowing milk will contain the occasional solid particle, for example clotted milk from a cow with mastitis or particles of dirt which were not removed from a cows' teats prior to milking. Such particles could clog a small orifice. However, it is difficult to release a small sub-sample of milk without some way to limit outflow.

One possibility for the extraction point is to direct at least part of the milk flow through a trap or well which retains a small amount of the milk after the sample quantity has passed the extraction point. This retained amount can then be put it into a collecting vessel as the sub-sample.

An alternative is to pass some of the flowing milk through a filter before delivering some of it into a receiving vessel, and then subsequently drive some filtered milk and/or compressed air in the reverse direction to clean off any solid particles retained on the filter.

In a further aspect the invention provides apparatus for releasing a sub-sample of milk from a flow of milk arriving at an extraction point, the apparatus comprising a control valve arrangement (incorporating one or probably more than one control valve) selectively operable to direct flow along more than one path, one of the possible paths of flow incorporating a valve operable to release milk into a receiving vessel, possibly while another path is open for flow. The valve might be operated once to put a sub-sample into a receiver, operated repeatedly to put a sequence of small drops into a single receiver, and/or operated to put a plurality of sub-samples into respective receivers.

Preferably the apparatus provided at the extraction point includes a transport device able to move the extraction point relatively to a plurality of receiving vessels so that a plurality of sub-samples can be released into respective receiving vessels.

A possibility to avoid the need for a transport device or at least simplify the transport requirements is to utilise a valve arrangement at the extraction point which is able to discharge subsamples of milk at more than one location thus giving rise to the possibility of discharging into a plurality of receiving containers without needed to move those containers. To bring this about, the control valve arrangement at the extraction point may include a plurality of outlet valves connected so that each outlet valve receives at least part of a flow of milk from an animal, the outlet valves then being selectively operable to deliver one or more subsamples of milk from an animal through any outlet valve. A particularly preferred construction utilises a plurality of outlet valves with valve chambers able to communicate with each other so that after the leading portion of a plug of milk has gone past the extraction point some or all of the remainder of the plug of milk can be passed through the valve chambers of all these outlet valves.

The controller for the apparatus preferably utilises signals from the sensor and other signals taken from the milking machinery as inputs. The controller utilises these inputs and then operates the control valves in appropriate order in accordance with a stored program.

The controller must incorporate a microprocessor together with storage for data and program. It may be a general purpose computer equipped with input/output devices to enable it to operate solenoid valves and receive input from the sensors and milking machinery. Alternatively it may be an industrial programmable logic controller incorporating electronic circuitry to receive input signals and send output signals to operate valves.

According to a further first aspect of the present invention there is provided a method of identifying an animal which has a predetermined substance within its milk, from within an overall number of milking animals, comprising:

a step of mixing milk from pluralities of animals which are a collection of first subsets of the overall number such that every animal is included in at least one of these first subsets, so as to form first test volumes of mixed milk each associated with a said first subset;

one or more further steps of mixing milk from one or more other pluralities of animals each of which is a further subset of the overall number, to form one or more further test volumes of mixed milk each associated with a further subset, such that each further subset includes at least one animal of a said first subset but is not identical to that first subset, testing each of the test volumes for a substance at a concentration greater than a threshold value, and optionally also testing milk of some individual animals for a substance indicative of mastitis, the allocation of animals and their milk to first and further subsets being such that an individual animal with the substance such as mastitis is identified with a total number of tests which is less than the overall number of animals.

However, this method may be utilised to identify a group of animals, one of which has mastitis, after which the individual animal is identified by inspection or in some other way. Consequently this method is more generally defined as a method of identifying a number of X animals (where X may be one or greater than one) at least one of which animals has mastitis, out of a larger overall number of Y or milking animals, comprising:

a step of mixing milk from pluralities of animals which are a collection of first subsets of the overall number such that every animal is included in at least one of these first subsets, so as to form first test volumes of mixed milk each associated with a said first subset;

one or more further steps of mixing milk from one or more other pluralities of animals each of which is a further subset of the overall number, to form one or more further test volumes of mixed milk each associated with a further subset, such that each further subset includes at least one animal of a said first subset but is not identical to that first subset, testing each of the test volumes for a substance indicative of mastitis and optionally also testing milk of some individual animals for a substance indicative of mastitis, the allocation of animals and their milk to first and further subsets being such that identification of the number X of animals, at least one of which has mastitis is accomplished through a total number of tests which is less than the overall number Y divided by the number X.

Embodiments of the invention will now be described in more detail, by way of example, with reference to the following drawings.

BRIEF DESCRIPTION OF THE DRAWINGS

FIG. 9 is a view similar to FIG. 6 showing one milking position in accordance with FIG. 8;

FIGS. 10 and 11 shows further forms of apparatus at one milking position;

FIG. 23 is a diagrammatic illustration of Example 3 showing division of a herd into mutually exclusive first subsets, intersecting mutually exclusive second subsets.

FIG. 24 is a diagrammatic illustration of Example 4 showing division of a herd into first, second and third subsets.

DETAILED DESCRIPTION OF THE PREFERRED EMBODIMENTS

The apparatus described below with reference to FIGS. 1 to 7, is an addition or modification to the normal machinery provided in a milking parlour. There are a wide variety of known layouts for milking parlours but a common feature is that one or more main suction lines extend through the milking parlour and at a plurality of positions along each main suction line a cluster of four teat cups is attached by means of a flexible hose. The cluster of teat cups may be used with one cow stall only or with two cow stalls alternately. The suction line is a source of vacuum for the teat cups, and conveys milk to a bulk tank.

Figure 1:
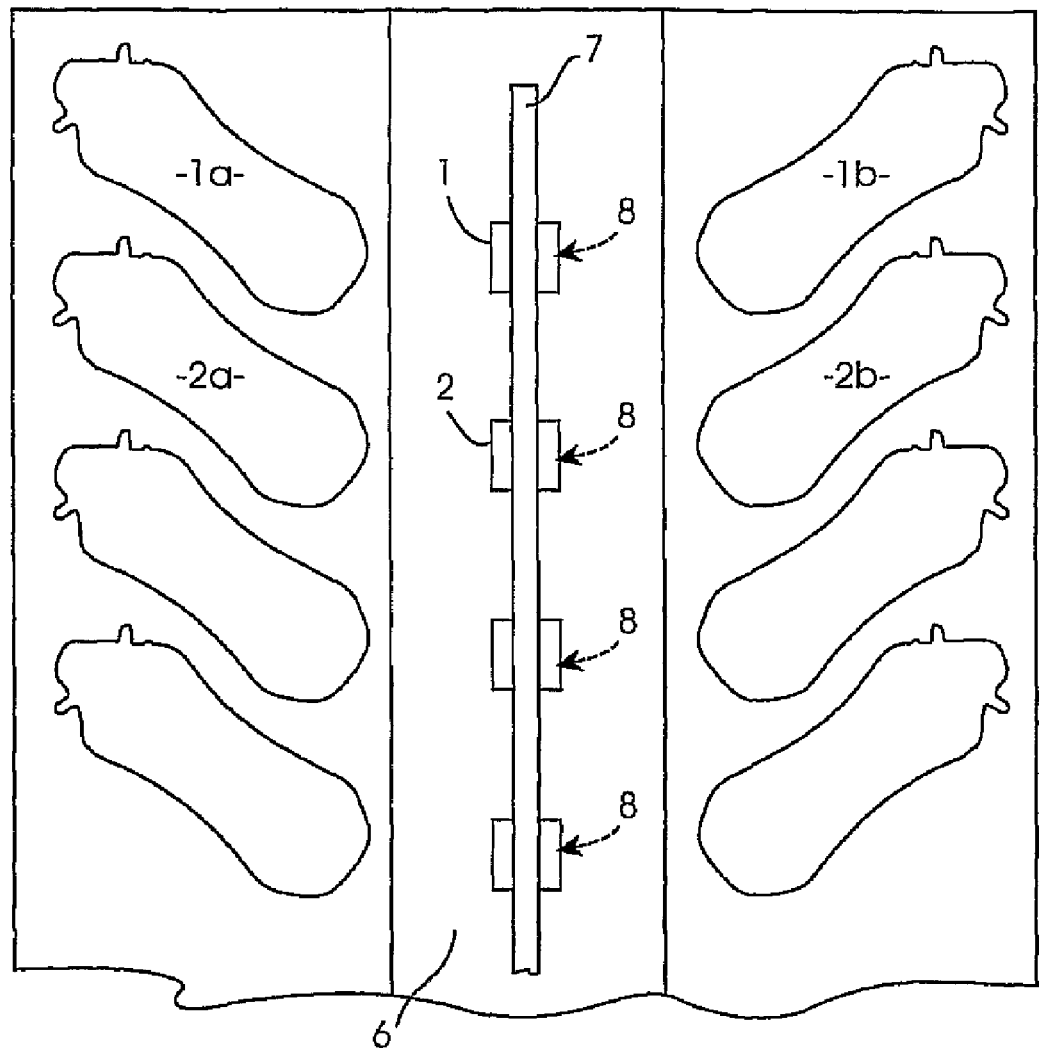
FIG. 1 is a diagrammatic overhead view of a milking parlour.

FIG. 1 diagrammatically shows a herringbone milking parlour in which there are cow stalls at either side of a central walkway 6, a suction line 7 is positioned above the central walkway and at each of the positions illustrated diagrammatically by a square box 8, a flexible hose leads from the main suction line to a cluster of four teat cups. Each cluster is used for two stalls alternately. Thus, the cluster attached at the position designated 1 is used for the stalls designated 1a and 1b alternately. The cluster attached at position 2 is used for stalls 2a and 2b alternately and so on.

In an arrangement where there was one cluster of teat cups associated with each cow stall, there could be a single suction line extending through the milking parlour or there could be two suction lines one at each side of the milking parlour.

Figure 2:
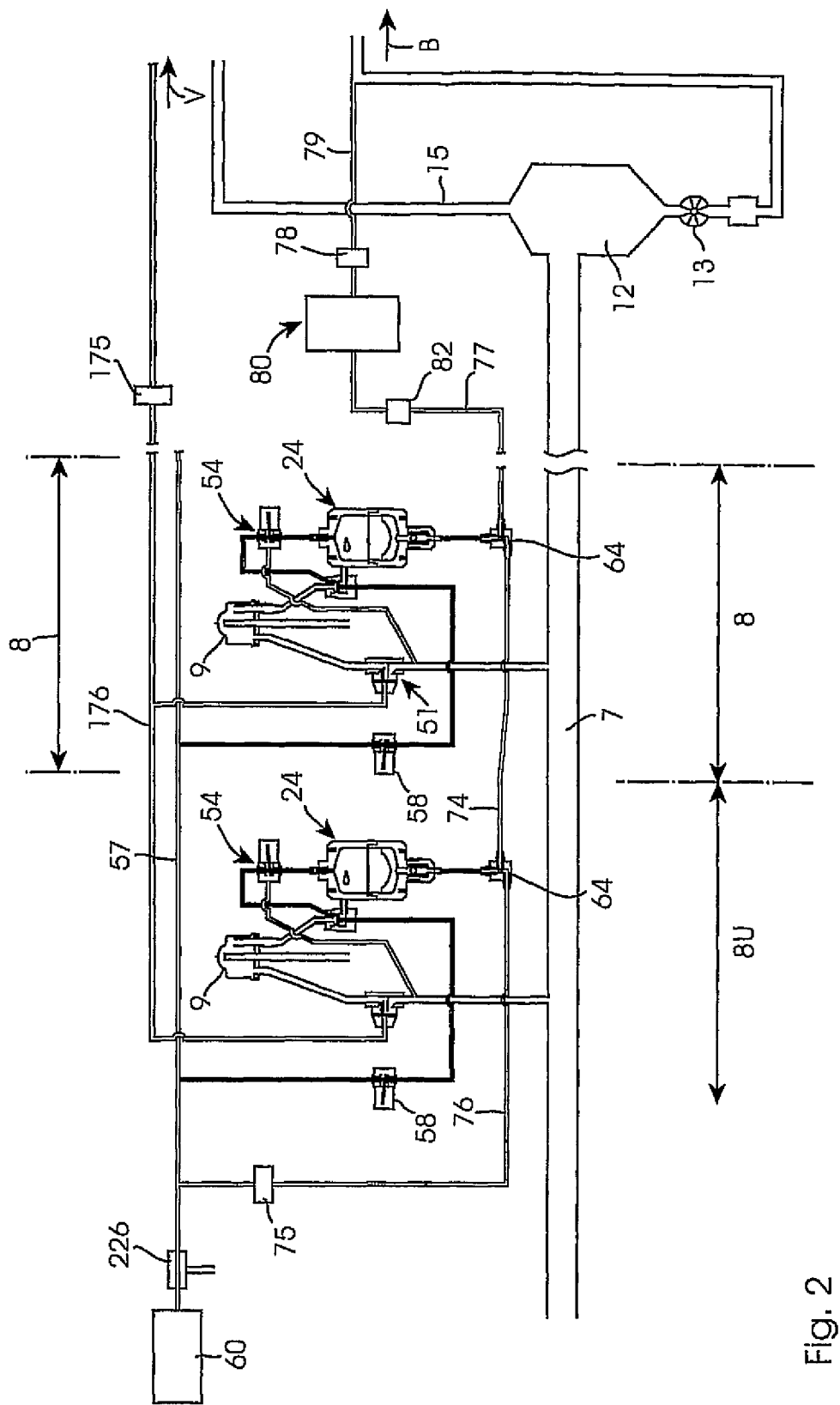
FIG. 2 is a general arrangement drawing showing apparatus of this invention added to conventional milking machinery.

In an embodiment of the present invention a milk meter is provided at each of the milking positions 8 along the suction line(s). As will be mentioned below with reference to FIG. 6, the flexible hose 11 connecting to the cluster is attached to an inlet 10 of the milk meter. The outlet of the milk meter is connected to the suction line 7. When a cow is milked the vacuum in the suction line 7 draws the milk through the milk meter into the line 7, which conveys it to the bulk tank. As shown in FIG. 2, the line 7 normally leads to a vacuum interception vessel 12 from which the milk is pumped by transfer pump 13 through a non-return valve so that milk flows in the direction of arrow B towards the bulk tank. A pipe 15 leads from the interception vessel 12 in the direction of arrow V towards the vacuum pump.

As also shown by FIG. 2, in accordance with this invention there is some additional equipment including a holding vessel 24 at each milking position. A flowpath for the transport of milk samples leads from the vessels 24 along pipes 74, 77 past a flow detector 82 to an extraction point 80 where sub-samples are taken out and the remaining milk is discharged through a pressure relief valve 78 into the bulk tank or into the pipework downstream from the transfer pump 13 where the milk is no longer under vacuum. As will be described in more detail below, the flowpath is formed by pipes 74 linking shuttle valves 64, and pipe 77 leading onwards to the extraction point 80. In FIG. 2 the milking position at the upstream end of this flowpath (and also at the upstream end of the main suction line 7) is designated 8U. A plurality of milking positions downstream along the flowpath have identical apparatus and are connected together in sequence. One of them is designated 8 and it should be appreciated that this apparatus would be repeated at each of a plurality of milking positions. Although it is convenient for the direction of flow along the flowpath pipes 74 to go in the same direction as flow along the main suction line 7, it should be understood that this is not essential.

Apparatus at One Milking Position

The equipment at one milking position will now be described with reference to FIGS. 3 to 7, beginning with description of a milk meter used to divert a sample quantity of milk from the overall milk flow from a cow.

Figure 6:
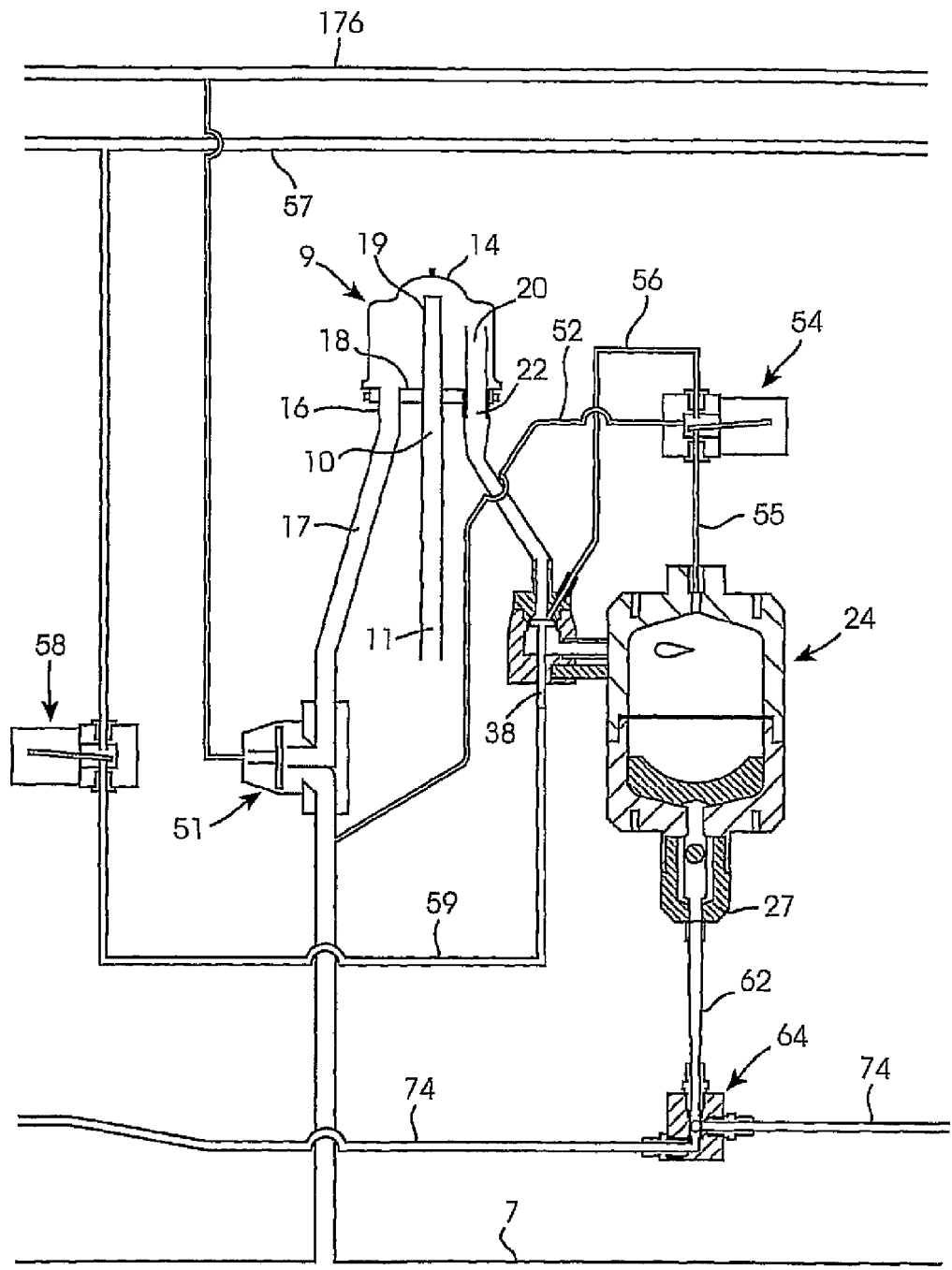
FIG. 6 is a diagrammatic general view of apparatus at one milking position showing connections to pressure and vacuum lines at one milking position.

FIG. 6 shows a general arrangement of a vessel 24 and other parts fitted at one of the milking positions along a main suction line 7. Similar parts are fitted at all the milking positions along the suction line. As shown in FIG. 6, this example of the invention uses the flow divider portion 9 of a conventional manual milk meter. It has a milk inlet pipe 10 terminating in an upwardly pointing spout 19 beneath a domed cover 14. The milk inlet pipe 10 is connected to a vacuum hose 11 bringing milk from the cluster of teat cups. A vacuum hose 17 connects outlet pipe 16 to the main suction line 7 in the milking parlour through a valve 51 which is kept always open except during cleaning after milking. While a cow is being milked, the milk is drawn up the inlet pipe 10 and sprays out onto the underside of the domed cover 14. It flows down the underside of the dome onto the platform 18 beneath, from where it runs into the outlet pipe 16 and is led off by the suction line 7 to the bulk tank. A small part of this flow of milk on the underside of the dome 14 is caught by an upwardly projecting channel 20 which leads to a separate outlet 22. In conventional practice a collecting vessel for a milk sample would be attached to this outlet 22. Since milk flows evenly over the underside of the domed cover 14, the proportion of milk which is led off down the channel 20 to outlet 22 is a constant fraction of the whole milk flow.

There are a range of milk meters available, both manual and electronic, but most of them remove a representative sample to a sample outlet by intercepting a fixed proportion of the milk flow.

The sample collecting vessel which is conventionally attached to outlet 22 from the flow dividing part 9 of the milk meter is not used here. Instead a holding vessel 24 and milk valve 30 are fastened at a position close to the milk meter. The milk inlet 34 of the valve 30 is connected to the sample outlet 22 of the milk meter. This may be a flexible connection by means of a vacuum hose or may be formed as a direct connection with rigid pipe.

Figure 3:
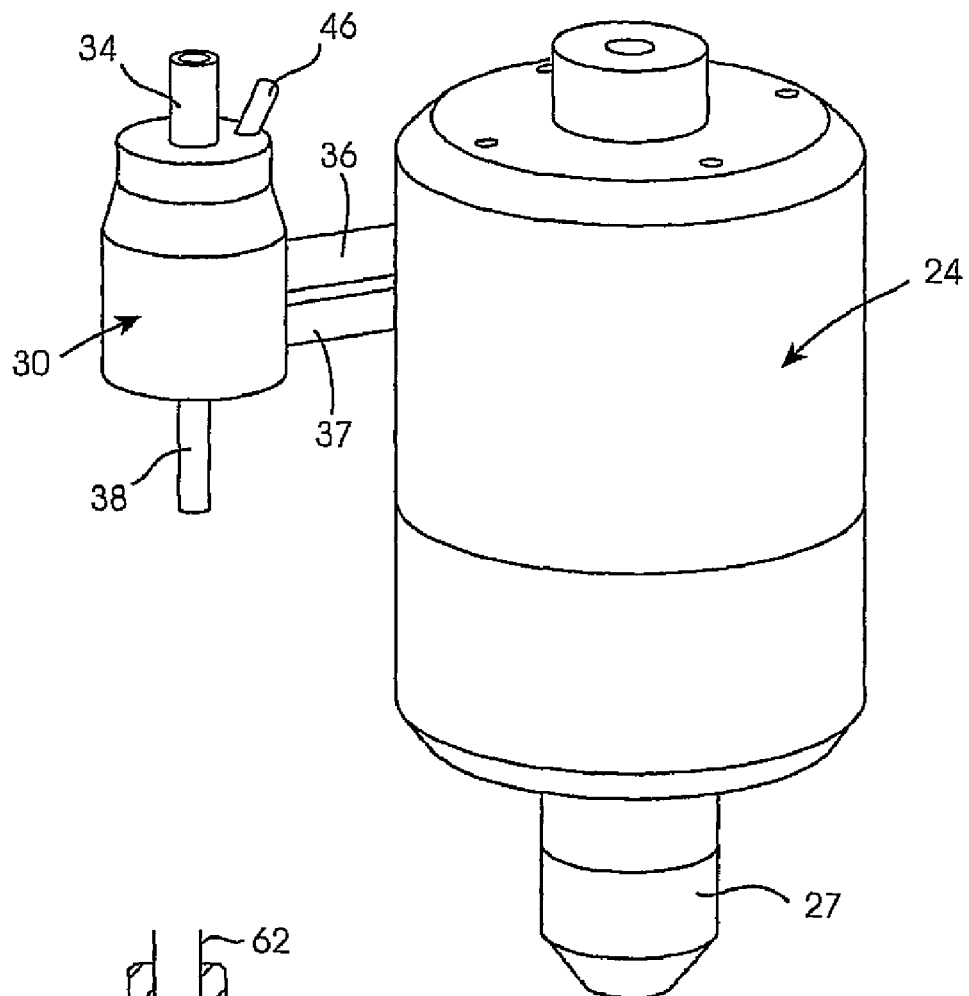
FIG. 3 is a perspective view of a sample vessel and milk valve.
Figure 4:
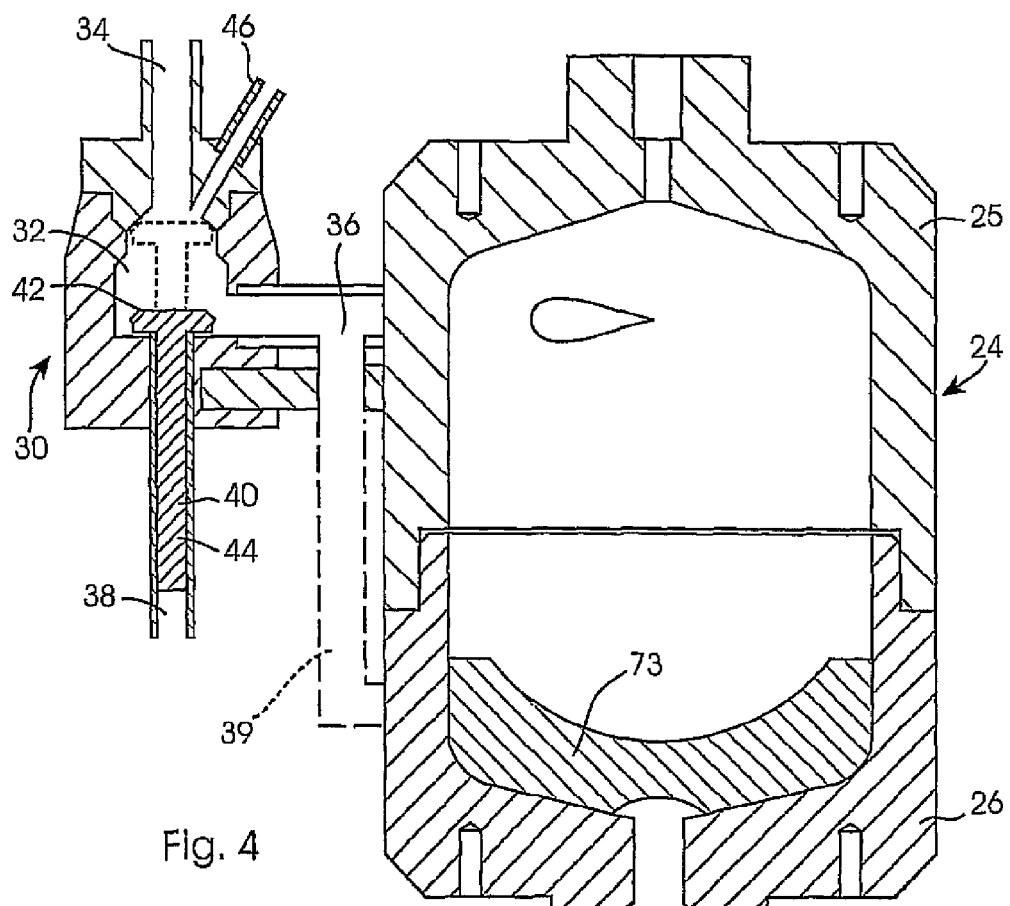
FIG. 4 is a vertical cross sectional view of the holding vessel and the milk valve.
Figure 5:
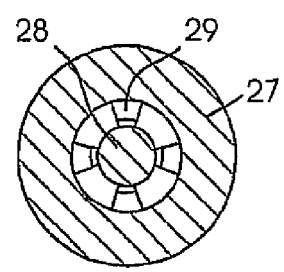
FIG. 5 is a section on line V-V of FIG. 4.

FIGS. 3 and 4 show the holding vessel and milk valve. The holding vessel 24 is constructed as a pressure vessel able to withstand the vacuum of the milking machinery which is typically 0.5 bar sub-atmospheric pressure. It is also able to withstand 2 bar positive pressure. The vessel 24 shown in the drawing is constructed with top and bottom pieces 25,26. These may be moulded from clear plastic and joined together with adhesive or by ultrasonic welding. The bottom piece 26 is connected to a sump 27 in which a ball 28 floats on any liquid and acts as a non-return valve inhibiting liquid in this sump from mixing with liquid in the main chamber of holding vessel 24.

The ball 28 is centred by ribs 29 within the sump 27. These provide a path around the ball 28, allowing downward outflow from vessel 24. The ribs also extend around the bottom of the sump to prevent the ball 28 from blocking its bottom outlet.

As best seen in FIG. 4, the milk valve 30 has a body made in two parts defining a central chamber 32 with an axial top inlet 34 for milk, a lateral outlet tube 36 and an axial bottom inlet tube 38 for compressed air. A movable valve member 40 is generally mushroom-shaped with a flat top 42 encircled by a rubber O-ring and located at the upper end of a valve stem 44 which is a loose sliding fit in the air inlet tube 38. There is a further port 46 positioned diagonally at the top so as to communicate with the inlet 34 immediately above the raised position (shown in chain lines) of the mushroom valve. The body of valve 30 is attached to the vessel 24 by the outlet tube 36 and also by a lateral pin 37 located below the outlet tube 36.

When the valve member 40 is lowered, milk entering through the top inlet 34 can flow through the chamber 32 and outlet tube 36 into the vessel 24. As can be seen from FIG. 5, the outlet tube 36 enters the vessel 24 at a tangential position from which milk falls gently down towards the bottom of the vessel 24.

If air pressure is applied to the air inlet tube 38, the mushroom-shaped valve member 40 is pushed upwardly by the air pressure to the position shown chain dotted where it closes off the main chamber 32 from the milk inlet 34. The port 46 then remains in communication with the inlet 34 above the top 42 of the mushroom-shaped valve member. At the same time, since the valve stem 44 is a loose fit in the air inlet tube 38, some air passes around the valve stem and through the outlet tube 36 into the vessel 24. Another possibility is for the valve stem 44 to be a good fit in tube 38, but with grooves in the valve stem 44 to allow some air to pass around the valve stem.

A pipe 52 connects the vacuum of the main suction line 7 to a solenoid valve 54 which is connected by pipe 55 to the top of the holding vessel 24 and also by pipe 56 to the port 46 at the top of the milk valve 30.

This solenoid valve 54 is of the rocker arm type with a solenoid operated actuator attached to a valve block. The pipe 52 is connected to an inlet port which leads into a cavity within the valve block. Outlet ports lead from this cavity and are connected to the pipes 55,56. A rocker arm projects into the cavity and is movable by the actuator to close one or other of the outlets. An elastomeric diaphragm between the block and the actuator incorporates a sleeve which encloses the projecting rocker arm and provides a seal between the valve block and the actuator.

A compressor 60 provides a supply of compressed air at approximately 2 bar pressure along a pipe 57. At each of the milking positions 8 a branch from the pipe 57 leads to a solenoid valve 58 which in turn is connected by a pipe 59 to the air inlet tube 38 of the valve 30.

The bottom opening of each vessel 24 is connected by a pipe 62 to a shuttle valve 64. As already mentioned, the shuttle 20' valves 64 and the pipes 74 which connect one valve 64 to the next form a flowpath for the movement of sample quantities of milk from the holding vessels 24.

Figure 7:
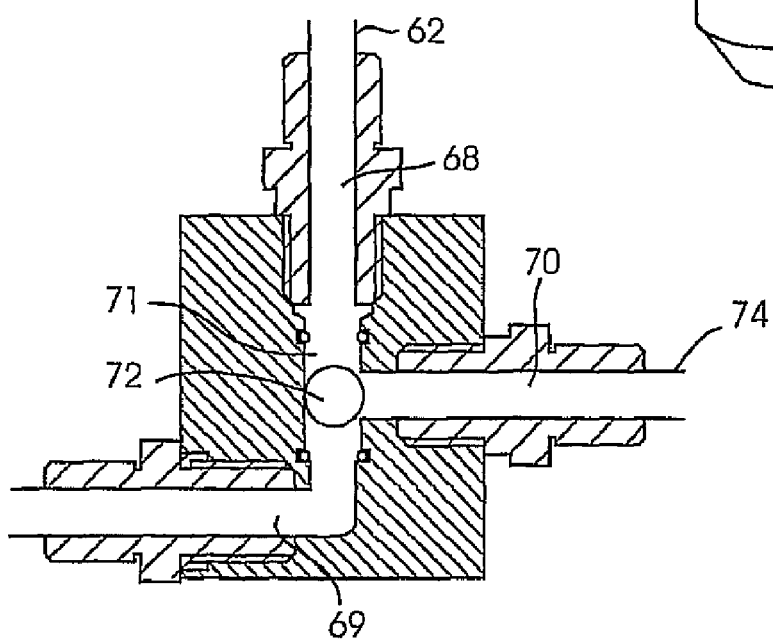
FIG. 7 is a cross-sectional view of a shuttle valve.

The construction of a shuttle valve 64 is shown in FIG. 7. As seen there it has a body with inlet ports 68, 69 and a lateral outlet port 70 all communicating with a central cavity 71. Within this cavity a valve member in the form of a small ball 72 is free to move. Pressure at either of the inlet ports 68,69 drives the ball 72 away from that port thereby connecting that port to the lateral outlet port 70 and closing the other of the two inlet ports. In place of the ball 72, the valve member could be a movable plug or a flexible flap or a pair of non-return valves back to back.

The outlet port 70 of the shuttle valve 64 is connected by a pipe 74 to the lower inlet port 69 of the corresponding shuttle valve at the next position along the suction line 7.

At the upstream end of this flowpath the compressed air line 57 is connected to a pressure reducer 75 which delivers 0.25 bar air pressure into a pipe 76 which goes to the inlet port 69 of the first shuttle valve 64. These shuttle valves 64 may be mounted in any orientation, not necessarily that shown in FIG. 7.

A pipe 77 leads from the lateral outlet port of the last shuttle valve in the downstream direction to an extraction point 80 which is described below and is preferably located away from the main working area of the milking parlour. After the extraction point 80 there is a pressure relief valve 78 set to retain at least 0.25 bar pressure in the flowpath. Downstream of the pressure relief valve 78 there is a connection 79 leading towards the bulk milk tank.

The pressure reducer 75 and the pressure relief valve 78 are set to approximately the same 0.25 bar pressure so as to maintain this as the minimum pressure in the flowpath.

It may be found convenient to set the reducer 75 to a slightly higher pressure than the relief valve 78, so that if the flowpath 64,74,77 is empty there will be a small airflow downstream along it.

In order to collect milk in a holding vessel 24 while a cow is being milked at that milking position, the solenoid valve 58 is closed so that there is no supply of compressed air to the inlet tube 38 of the milk valve, the mushroom valve member 40 within that milk valve 30 is in its lower position and milk from the sample outlet 22 of the milk meter is able to flow through the milk valve 30 into the holding vessel 24. At this time the solenoid valve 54 connects pipe 52 to pipe 55 and thus places the interior of the vessel 24 under the vacuum provided by the suction line 7. Pressure from the reducer 75 maintains a positive pressure in the pipes 76 and 74. Consequently the ball 72 in the shuttle valve is held against the port 68 thereby closing the pipe 62 and preventing milk from flowing out of the bottom of the vessel 24.

The first part of the milk entering the vessel 24 goes into the sump 27 and is confined beneath the ball 28 as more milk accumulates in the main part of the vessel 24.

Before the next cow is milked at this position the vessel 24 must be emptied. As a preliminary, valve 54 is operated, connecting vacuum pipe 52 to pipe 56 and at the same time closing the pipe 55. The vessel 24 is still under vacuum. Next the vessel 24 is pressurised by operating the solenoid valve 58 to deliver air pressure along the line 59 to air inlet 38 thereby raising the mushroom valve member 40 which closes off the connection to the milk meter. Compressed air is able to pass around the stem 44 of the valve member, as mentioned above, and through the outlet tube 36 into the vessel 24 and as a result the milk in this vessel is subjected to 2 bar positive pressure which drives the milk downwardly through the bottom outlet of the vessel 24. The ball 72 in the shuttle valve 64 is driven away from port 68 by the positive pressure applied to the milk above it. An upright plate 73 extends across the base of the vessel 24 to prevent the milk from forming a vortex and mixing with air as it leaves the vessel 24.

Milk is able to flow out of the vessel through the shuttle valve 64 beneath because the 0.25 bar pressure in the flowpath is overcome by the higher pressure applied above the milk. The milk therefore flows downwardly and downstream along the flowpath. At each of the downstream shuttle valves 64 the ball in the valve is held against port 68 of that valve because there is more pressure in the flowpath than in any holding vessel 24 except the one which is being emptied into the flowpath. Consequently the sample quantity of milk passes through each shuttle valve 64 and on down the flowpath.

The pipes connecting the shuttle valves together to form the flowpath are made of fairly small bore PTFE pipe, typically 6 mm internal diameter. Consequently when milk flows along this flowpath it fills the entire cross section of the pipe for a considerable length. For example, if the milk collected in vessel 24 from one cow has a typical volume of 0.5 liter, it will occupy a flowpath length of approximately 17.5 meters in pipe of 6 mm internal diameter.

Once a vessel 24 has emptied into the flowpath, which is detected when the trailing end of the plug of milk in the flow path passes the sensor 82, the solenoid valve 58 associated with that vessel is closed. The pressure in that vessel and in the flowpath downstream of it slowly decays to the pressure of 0.25 bar maintained throughout the length of the flowpath as milk and then air are driven out through the pressure relief valve 78. The mushroom-shaped valve member 40 remains in its raised position because pipe 56 above it can never be at a pressure above atmospheric. Allowing pressure in the holding vessel to decay is beneficial in reducing the effect on the vacuum system when the vessel is once again connected to vacuum.

A preferred sequence of operations at one of the milking positions as a cow is milked will now be described in a little more detail.

Initially, before the cluster of teat cups is fitted to the cow, the solenoid valve 58 is in its closed state so that there is no supply of compressed air to the inlet tube 38 of the milk valve. The mushroom valve member 40 within that milk valve 30 is in its upper position. Milk from the sample outlet 22 of the milk meter is prevented from flowing into the milk valve 30 into the holding vessel 24.

The mushroom valve is held in its raised position by the residual pressure of 0.25 bar that has remained in the holding vessel 24 after the milk from a previous cow was emptied from it. The position of the ball in the shuttle valve 64 is immaterial as there is no liquid in the vessel 24. Any liquid approaching the shuttle valve from the upstream direction will be driven by a positive pressure of 2 bar which will force the shuttle valve to shut against port 68. If there is no liquid in the flowpath pipes 74, pressure admitted via the reducer 75 will ensure that pressure in the flowpath pipes 74, 77 will not fall below 0.25 bar.

As the first milk from the cow flows along hose 11 and through the flow-dividing parts 9 of the milk meter, it will mix with residues of milk from a previously milked cow. To remove this mixed milk, the mushroom valve member 40 is kept raised for a short time after milking begins. The initial spurts of milk reaching the inlet 34 of the milk valve 30 are sucked off the top of the mushroom valve and up pipe 56.

Next, the valve 54 switches the vacuum supply to pipe 55. This exhausts the residual positive pressure from the vessel 24. This causes the ball of the shuttle valve 64 to close on port 68 as there is now a pressure differential between the flowpath pipe at 0.25 bar positive pressure and the sample vessel at milking vacuum.

The delay before the valve 54 switches to pipe 55 could start from a signal indicating that a cow is attached to the milking cluster or from a milk flow measurement by an electronic milk meter or an ACR flow meter.

This delay in lowering the mushroom valve so as to open the milk valve 30 is designed to eliminate cross contamination of milk samples from successive cows milked at the same milking position. The mushroom valve drops under gravity when pressures both side of the valve are equal, and permits milk to flow into vessel 24.

The first portion of milk entering the vessel 24 through the milk valve 30 will mix with residues of milk from the previous sample, and is collected in sump 27. Milk from the sump 27 becomes part of the first portion of a plug of milk travelling along the flowpath. In accordance with this invention it is directed past the extraction point 80 and so does not become part of the subsample retained.

The floating ball 28 in the sump 27 inhibits mixing with milk in the main body of vessel 24. When the milk level fills the sump the ball floats to the top but does not totally seal the inlet to the sump (there is a cusp in the seat to prevent this) in case this would stop the shuttle valve working properly.

It is not essential to collect a sample in the holding vessel 24 every time a cow is milked. If it is not desired to take a sample, the vacuum pipe 52 is allowed to remain connected to the pipe 56. The mushroom valve member in the milk valve stays up preventing milk from entering the vessel 24. Milk which arrives at the inlet 34 is drawn off along pipes 56 and 52 to the main suction line 7.

Variations

A possible modification to the milk inlet to the holding vessel 24 is shown in broken lines in FIG. 4. A branch 39 from the pipe 36 descends in front of the pin 37 and enters the holding vessel at a low point, behind the anti vortex plate 73. When milk arrives at the valve 30 and enters the pipe 36, it runs down the branch pipe 39 into the vessel 24. The first part of the milk runs into the sump 27 as described previously, but as the vessel fills, the milk arriving along the pipe 39 enters the vessel 24 below the rising surface of the milk, and keeps the milk in motion and more homogenous. With such an arrangement, it is desirable to use a wide bore connection from the flow divider 9 to the inlet 34 of valve 30 so that any air in the milk can escape towards the vacuum of the main pipeline 7. Subsequently, when air under pressure is admitted to the vessel 24, it enters through the pipe 36 above the surface of the milk, as previously described.

Figure 8:
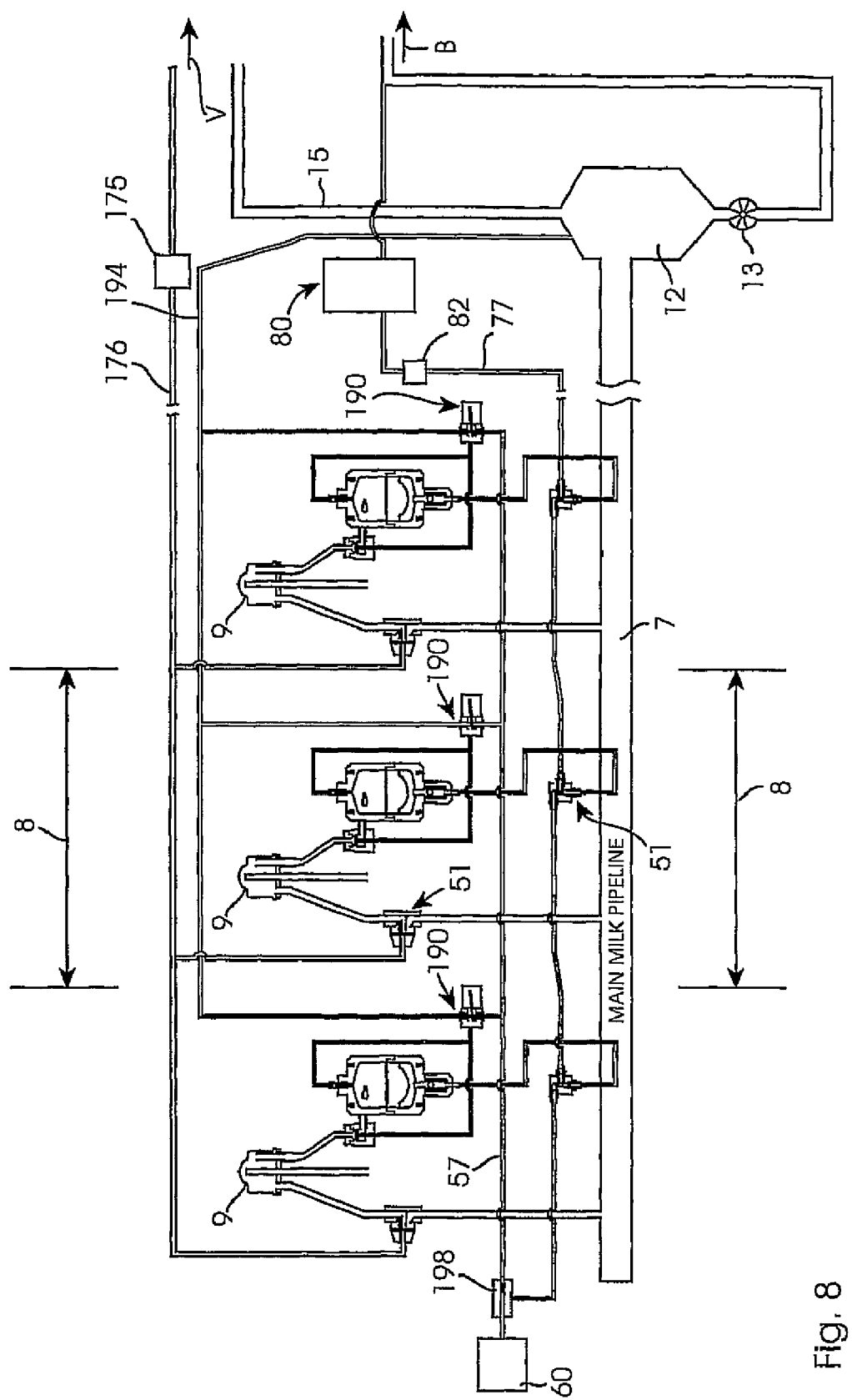
FIG. 8 is a general arrangement drawing similar to FIG. 2, but with a different form of apparatus.

FIGS. 8 and 9 show an arrangement which is somewhat different from that shown in FIGS. 2 to 6. At each milking position, the milk valve 30 is generally as described before except that it does not have a diagonal port 46. A three-way solenoid operated valve 190 can be operated to connect its port 192 either to compressed air at 2 bar pressure supplied along line 57 or alternatively to the vacuum of the milking machinery supplied along a pipe 194 which is connected to the top of the interception vessel 12. The port 192 of valve 190 is connected to the top of the holding vessel 24 through a pipe 195 and a non-return valve 196 which prevents air from entering the top of vessel 24. It is also connected to the bottom inlet 38 of milk valve 30. This arrangement requires only this one solenoid-operated valve 190 associated with and located at each milking position.

In order to collect milk from a cow in the vessel 24, the valve 190 is operated to connect its port 192 to the vacuum supply along line 194. This places the interior of the vessel 24 and the inlet 38 to the milk valve 30 under vacuum. The mushroom shaped valve member 40 in the milk valve 30 falls under gravity so that milk from the outlet 22 of the flow dividing portion 9 of a milk meter can flow through the milk valve 30 into the interior of the vessel 24. Because there is no port equivalent to port 46 shown in FIGS. 2 to 6, the first spurts of milk containing residues of milk from a previously milked cow will go into the vessel 24 and run down into the sump 27. In view of this, the sump may be made somewhat larger than the sump used in FIG. 6, if so desired.

After milk has been collected in the vessel 24, some air may enter the inlet 34 of the milk valve as the cluster of teat cups is removed from the cow. Entry of this air into the vessel 24 will lessen the vacuum in the vessel but cannot take its pressure above atmospheric. This air will be removed from the vessel 24 through the non-return valve 196 and along the line 195.

The holding vessel 24 is kept under vacuum in this way until the overall system is ready for the milk in the vessel 24 to be transmitted towards the extraction point 80. The valve 190 is then operated to supply compressed air from line 57 through port 192 to the air inlet 38 at the base of the milk valve 30, raising the valve member within the milk valve and pressurising the interior of the vessel 24 as described previously with reference to FIG. 6. The non-return valve 196 closes against the air pressure delivered along pipe 195 thereby ensuring that the air pressure goes to the air inlet 38 of the milk valve to lift the valve member within that valve.

The milk is discharged from the vessel 24 through shuttle valve 64 and out along the flowpath 74,77. When all the milk has passed the detector 82 the valve 190 is operated so as once again to connect its port 192 to the vacuum in line 194. This draws out the residual air from the interior of the vessel 24.

The advantage of the apparatus of FIGS. 8 and 9 is that only one solenoid operated valve is required for each milking position. There is no provision to keep the milk valve 30 closed during milking and it is therefore necessary to collect milk in the holding vessel 24 every time a cow is milked at the milking position but this may well be acceptable. It may be possible to fit a shut off valve on each sampling vessel but this could add complexity and cost to the apparatus. The sample pot of the cow milk of which is required to be tested, could be emptied before milking. The other animals would fill their sample pots in the usual way which would then be emptied into the bulk tank when appropriate.

It is desirable to reduce the vacuum fluctuation which could result from the discharge into line 194 of pressure from the holding vessel 24 after the milk in this vessel has been discharged through the shuttle valve 64 into the flowpath towards the extraction point. One possibility for doing this is to interrupt the supply of air to the line 57 temporarily before operating the valve 190 to reconnect its port 192 to the milking machine vacuum along 194. Another possibility is to provide a flow restricting device in the connection between the valve 190 and the vacuum line 194.

It would be possible to omit the pipe 195 and non-return valve 196, constructing the holding vessel 24 with a closed top. The apparatus would still operate generally as just described. The benefit of providing a connection to the top of the holding vessel 24 by way of pipe 195 and non-return valve 196 is that this provides a wider bore connection to vacuum than around the valve stem 44, so that there is less risk that it will clog. Another benefit is that during subsequent cleaning, cleaning fluid can circulate through the pipe 195 giving more effective cleaning of the vessel 24. As illustrated by FIG. 8, there is now no necessity to provide pressure of 0.25 bar into the upstream end of the flowpath 64,74,77. It may be desired to provide a valve 198 serving to admit compressed air at 2 bar pressure directly into the upstream end of the flowpath as a means of blowing through it after a plug of milk has passed the extraction point 80 and the flowpath is empty. The flow of air along an empty flowpath would be substantial and would help to blow out any residual droplets of milk which may remain in the flowpath. Of course, admission of compressed air through such a valve 198 could be started as soon as the tail end of a plug of milk has been detected by the sensor 82.

Figure 10:
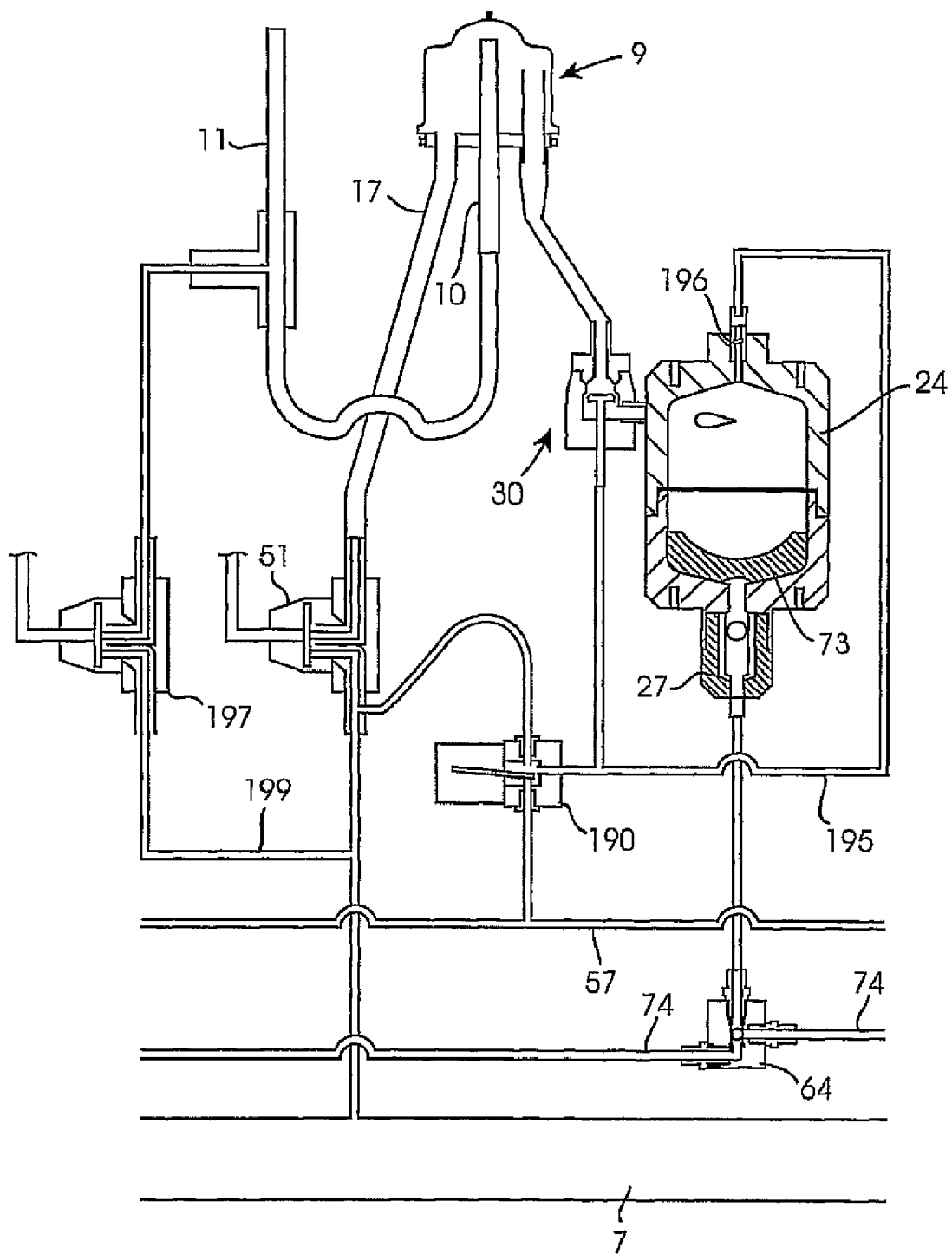

FIG. 10 shows a modification to the arrangement seen in FIG. 9. The three-way valve 190 is connected to the compressed air line 57 and also connected to a source of vacuum. Here the source of vacuum is a direct connection to the pipe leading from the pressure operated valve 51 to the main suction line 7.

The pipe 11 which brings the milk from the teat cluster to the inlet 10 of the flow divider 9 incorporates a T-piece which is connected to a further pressure operated valve 197. This valve is also connected along pipe 199 to the main vacuum pipeline 7.

Apparatus as shown in FIG. 10 may be useful in circumstances where milk samples are not taken at every milking. On days when samples are not being taken, the valve 197 is kept open and the valve 51 is kept closed throughout mincing, except during cleaning afterwards. Milk from a cow flows through the valve 197 to the milk pipeline 7 and the flow divider 9 is not used at all. As a result the vacuum in the pipe 11 is not exposed to any fluctuations brought about through the operation of the flow divider 9.

When samples are being taken the valve 197 is kept closed and the valve 51 is kept open so that milk from the cow arriving along line 11 enters the flow divider through its inlet 10 and the diversion of a milk sample into the holding vessel 24 takes places exactly as described with reference to FIG. 9.

It is mentioned below that all valves 51 can be connected to a single source of operating pressure, so that they all open and close in unison. Valves 197 can likewise be connected to a single source of operating pressure, so that they likewise open and close together. Using valves 197 and 51 in this way is less laborious than disconnecting vacuum hoses from the flow dividers 9 when these are not required.

FIG. 11 shows an arrangement in which the milk valve 30 is omitted entirely. The pipe 200 from the outlet 22 of the flow-dividing part 9 of a milk meter goes directly to the top of the holding vessel 24 and has a relatively wide bore (e.g. of at least 10 mm internal diameter) so that the interior of the holding vessel 24 is connected to the vacuum within the milk meter along this pipe 200 even while milk is flowing into the vessel 24 from the flow dividing part 9 of the milk meter. Instead of using air pressure to empty the vessel 24 into the flowpath leading towards the extraction point 80, a pump 202 is provided between the bottom outlet of the sump 27 and the inlet 68 of the shuttle valve 64.

Figure 12:
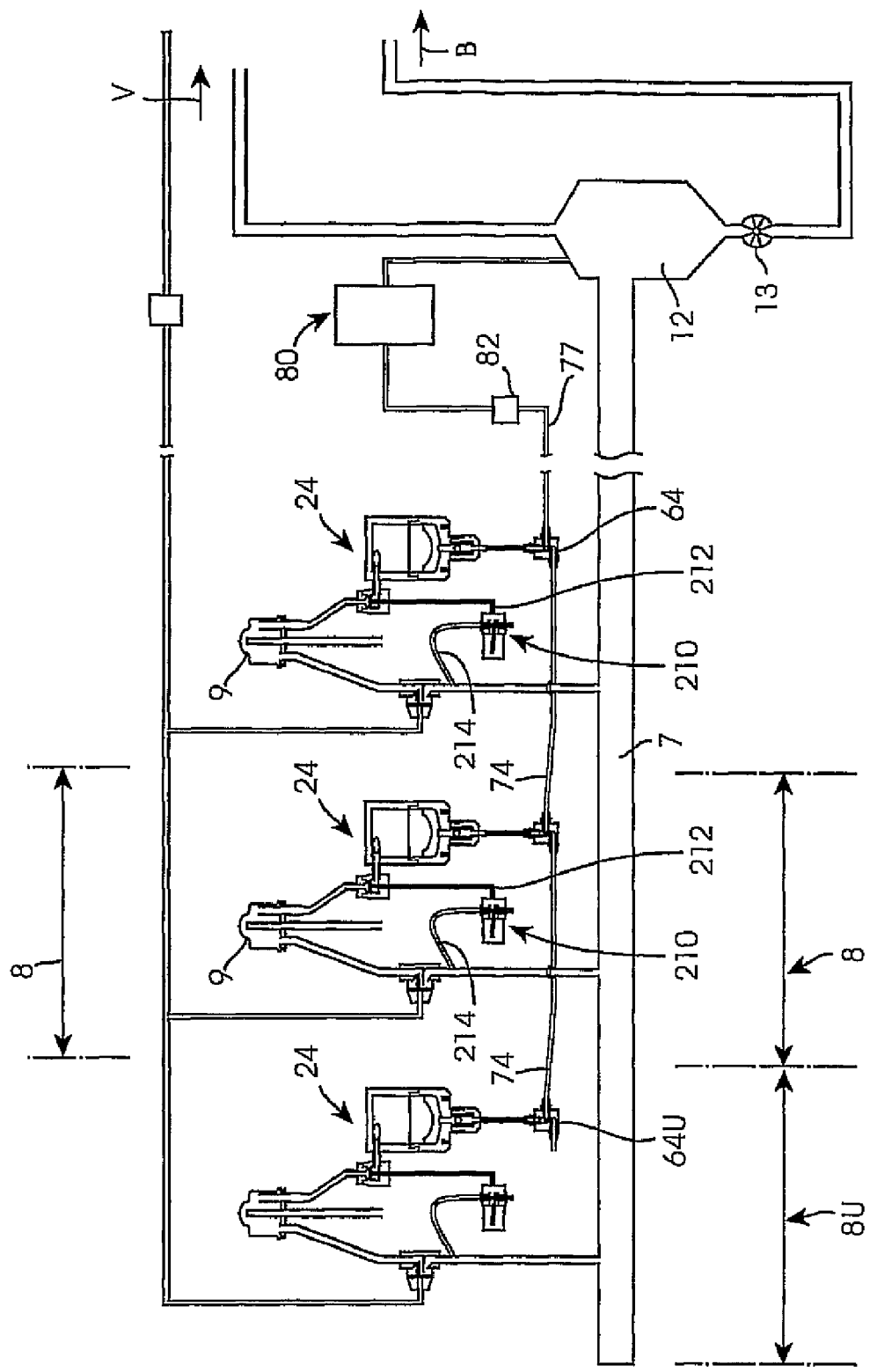
FIG. 12 is another general arrangement drawing showing a further variation.

FIG. 12 shows a further possibility for the general arrangement. Downstream of the extraction point 80, the pipe 79 is connected to vacuum above the milk in the interception vessel 12. Compressed air is not utilised. Each holding vessel 24 has a closed top. A valve 210 can be operated to connect its port 212 either to vacuum provided by a connection 214 to the pipework of the milking machinery or alternatively to atmosphere.

At the upstream end of the flowpath 64,74,77 the upstream shuttle valve 64U has its inlet 69 open to atmosphere so that there is a pressure differential to hold each shuttle valve 64 closed against its port 68 thereby retaining milk in the holding vessel 24 above it until the valve 210 is operated to admit atmospheric pressure (in place of the positive pressure used in previous embodiments described above) to the interior of the holding vessel 24 in order to discharge the milk from within the holding vessel 24.

Other constructional variations are possible. It is not preferred, but the milk valve could be solenoid operated rather than air pressure operated. The sump 27 could be of any desired size, and could even have a separate air supply so that the sump could be discharged into the flowpath separately, before discharging the holding vessel to the flowpath through the emptied sump.

Figure 13:
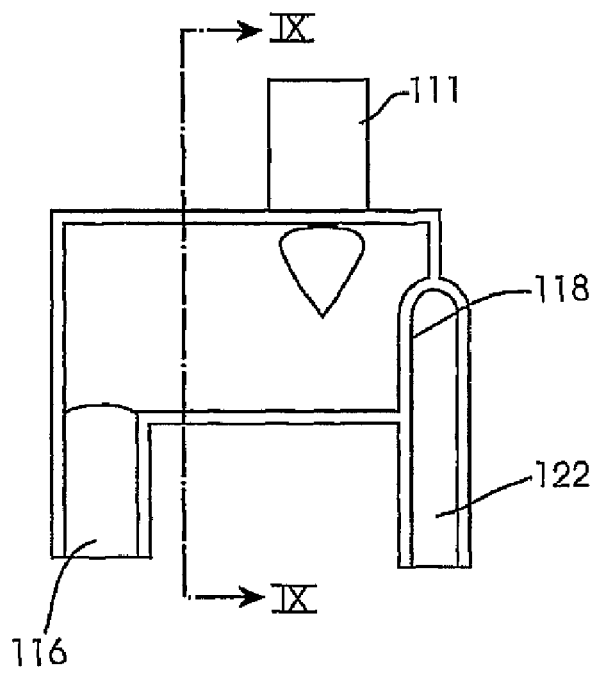
FIGS. 13 and 14 are mutually perpendicular cross-sectional views of an alternative flow divider.
Figure 14:
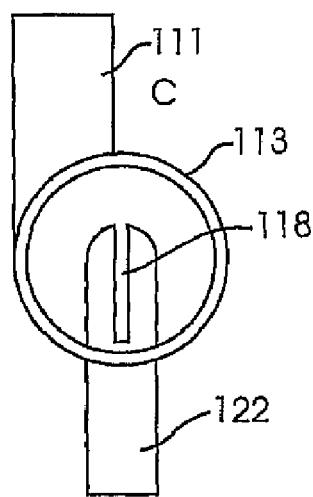

FIGS. 13 and 14 show an alternative flow diverter which can be used in place of the flow diverter portion of the milk meter, if it is not necessary for the milk collected in a holding vessel 24 to match accurately the overall composition of the milk from the cow.

It has a cylindrical body 113 with an upper tangential inlet 111. A main outlet 116 opens from one end of the body 113. A sample outlet 122 from the other end of the body communicates with the main body through a slot 118.

Milk entering the main body 113 swirls around inside and mostly leaves by the main outlet 116. A smaller amount passes through the slot 118 and leaves by the sample outlet 122.

The Extraction Point

The flowpath 64, 74, 77 conveys the milk samples one at a time to the extraction point 80 where there is apparatus to separate out a small sub-sample and put it into a receiving container which can then be sent for analysis.

The remainder of each sample quantity is then discharged through a pressure relief valve 78 into pipe 79 which leads to the bulk milk tank (or to pipe conveying the main flow of milk to the bulk tank, Movement of milk along the pipe 77 is detected by a sensor 82 which is able to detect whether the pipe at the location of the detector contains liquid or is empty.

There are several types of detector which could be used for this purpose, but the sensor shown here is an ultrasonic sensor supplied by Inline Sensors Ltd which sends an ultrasound pulse through the pipe and detects the amplitude of the pulse received at the other side of the pipe.

Figure 15:
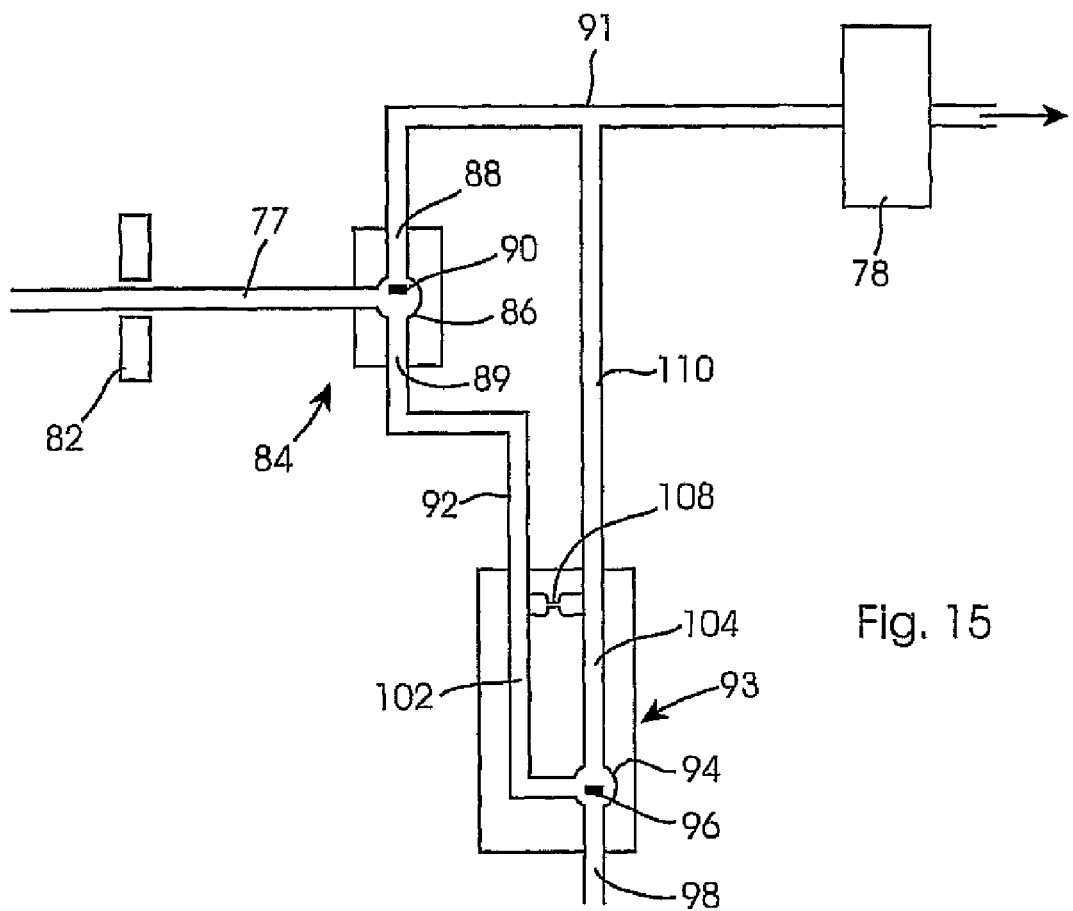
FIG. 15 is a diagram of one form of extraction point.

FIG. 15 illustrates one form of valve apparatus at the extraction point. This apparatus relies on two solenoid operated valves of the rocker arm type. The solenoids are behind the plane of the drawing. The valve 84 has a valve block with a central chamber 86 located between upper and lower ports 88, 89. Within the chamber 86 the rocker arm 90 can close off the upper port 88 or alternatively the lower port 89.

The valve 84 directs flow from the pipe 77 either along pipe 91 which leads out towards the pressure relief valve 78 or along pipe 92 which leads to the other solenoid valve 93. Alternatively the milk flow could simply travel down the pipe 92 without the need for valve 84.

The valve 93 has a larger valve block with a chamber 94 and a rocker arm 96 which can open or close the bottom outlet port 98. There are two routes through this valve block. Passages 102, 104 and the chamber 94 form a U-shaped connection between the inlet and outlet but these are also connected along a by-pass passage 108 which includes a constriction dimensioned so that milk flows around the U-shape and so through the chamber 94, as well as through the by pass 108. Outflow along pipe 110 leads to pipe 91 and then out towards the pressure relief valve 78.

In operation, when a plug of milk from a holding vessel 24 arrives along the pipe 77, its arrival is detected by the sensor 82 and the valve 84 is operated so that all flow travels along the pipe 91 and out towards the pressure relief valve 78 and thence to the bulk tank.

After a delay period to allow the leading portion of the plug of milk to pass the extraction point by this route, the valve 84 is switched over so that flow is directed along pipe 92 to the tubes 102, 104, 108, 110 and chamber 94.

Flow continues in this way until the sensor 82 detects the trailing end of the plug of milk. Valve 84 is then switched so that the very last bit of milk (which may contain foreign bodies which floated to the top within holding vessel 24) follows the more direct route down pipe 91. When the plug has gone past, air expels the milk from all the tubes except the tubes 102 and 104. The air flow goes through the by pass 108 because the constriction in the by-pass offers little resistance to air flow. At this stage the rocker arm of valve 93 is operated to open the bottom outlet 98 and deliver the milk from the tubes 102, 104 and chamber 94 into a receiving vessel below. With this arrangement the sub-sample of milk delivered into the receiving vessel is the quantity which was left behind in the tubes 102 and 104 and chamber 94. It all comes from near the end of the trailing portion of the plug of milk arriving at the extraction point along pipe 77.

Figure 16:
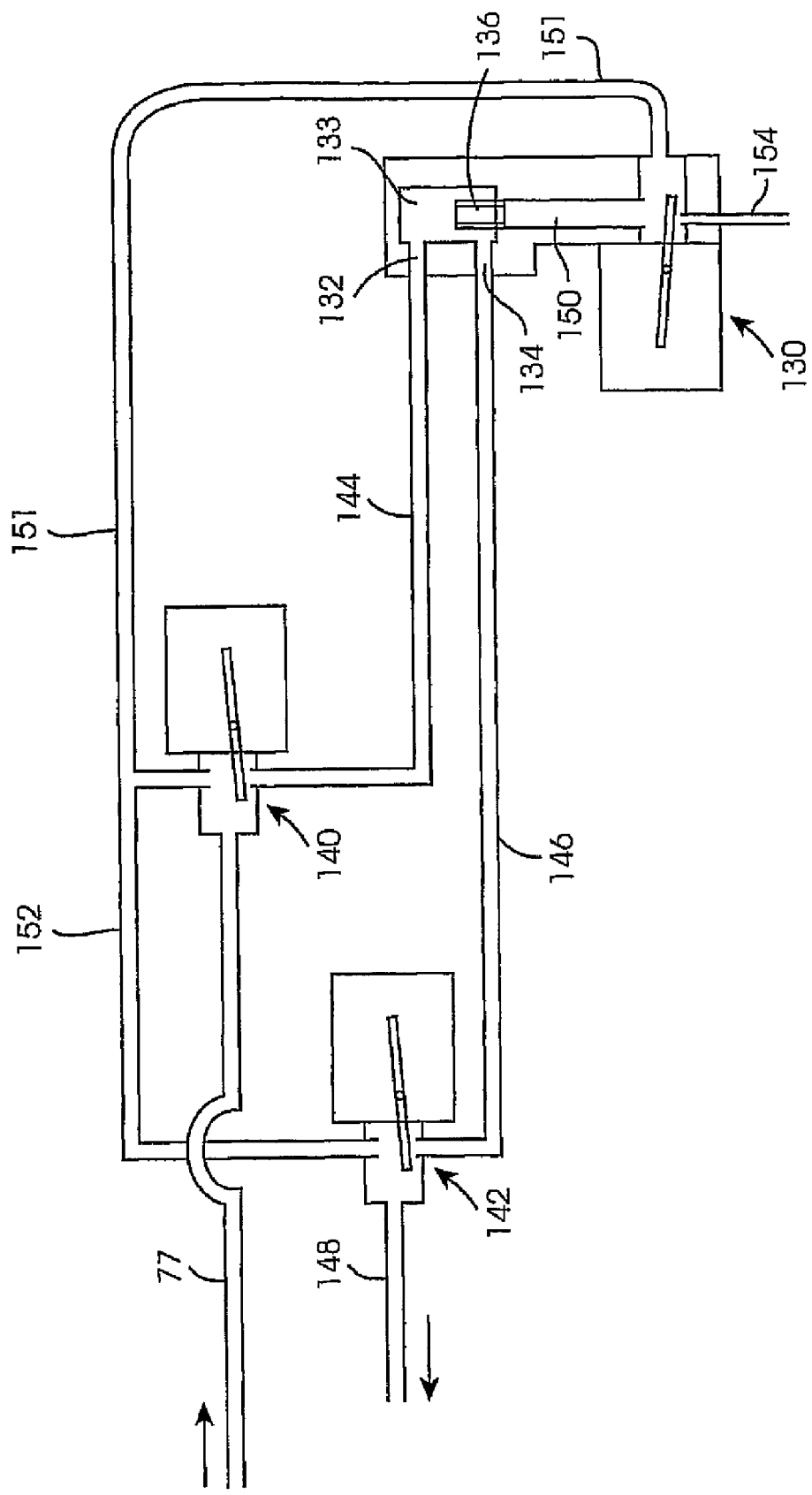
FIG. 16 is a diagram of a different form of extraction point.
Figure 17:
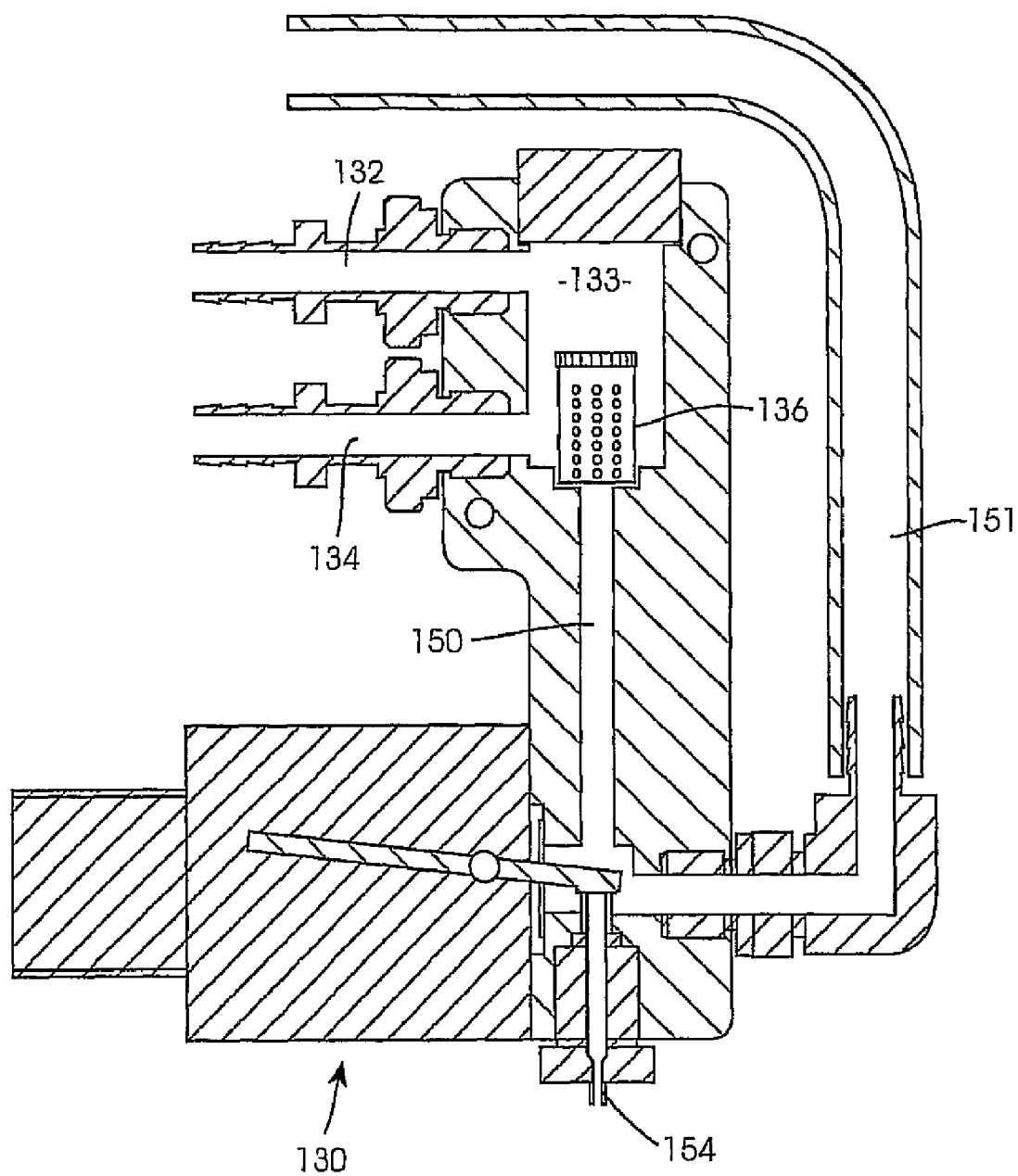
FIG. 17 is an enlarged view of the discharge valve assembly and milk filter used in FIG. 16.

The preferred arrangement shown in FIGS. 16 and 17 incorporates a milk filter and utilises three valves of the rocker arm type described previously. This milk filter is built into the valve block of valve 130. The milk filter chamber 133 has an inlet at 132 with a lateral outlet 134 which allows milk to flow around the filter but without passing through the filter mesh 136. It is dimensioned so that there is a gap of at least 3 mm between the outside of the filter mesh 136 and the inside walls of the filter chamber 133. Liquid passing through the filter mesh 136 can leave by an axial bottom outlet into a passage 150.

When a plug of milk from a holding vessel 24 arrives at the extraction point via pipe 77, the valves 140 and 142 are both set to close their upper ports. The whole flow of the milk travels along pipe 144 to the inlet 132 of the filter chamber, then through outlet 134 and back along pipe 146 to valve 142. The outlet pipe 148 from valve 142 leads to the pressure relief valve 78. The bottom outlet of valve 130 is kept closed.

After the leading portion of the plug of milk has gone past the extraction point by this route, valve 142 is operated to open its upper port and close its lower port, so blocking flow along pipe 146. This allows the full flow of milk to pass through the filter mesh and enter the passage 150 above valve 130, from which it returns to valve 142 along pipes 151,152.

In order to take a sub-sample of milk the bottom outlet of valve 130 is opened for a short time allowing some filtered milk to flow out through tube 154 into a receiving vessel. Because this flow path is receiving only filtered milk, the outlet tube 154 can be dimensioned with a small cross-section thereby restricting the rate of flow with the result that the amount of milk taken out through valve 130 as a sub-sample is only a small proportion of the milk flowing along the flowpath and out through the valve 142.

Opening valve 130 to discharge milk through tube 154 could be done once only as the plug of milk from a cow is flowing past the extraction point, thereby taking a sub-sample from a plug of milk. Alternatively it would be done several times for shorter intervals with the discharged milk mixing in a receiving vessel to provide a more representative sub-sample taken from several different points along the plug of milk. Repeated opening of valve 130 could also be used to take several separate sub-samples for different tests.

Periodically, while valve 130 closes off the outlet tube, the valve 140 is operated to open its upper port while simultaneously the valve 142 is operated to open its lower port. This state is maintained for a short time, during which some incoming milk flows along pipe 151 towards valve 130, driving some of the filtered milk in the passage 150 and pipe 151 (the long length of pipe 151 gives it a substantial volume) back through the filter mesh 136 to flow out through outlet 134 and along pipe 146 to valve 142. This brief reverse flow serves to clean the filter mesh 136, after which the valves 140,142 are operated to resume the previous pattern of flow.

In a variant of this operating procedure, the filter is not cleaned with a reverse flow of filtered milk as the plug of milk is flowing through these valves at the extraction point.

Instead, after the plug of milk has gone past, some of the compressed air behind it is directed along the same reverse flow route, that is along pipe 151 and back through filter mesh 136, thus blowing off any particles which have collected on the filter. At the same time some air can be blown out through the outlet tube 154 to clear it. This blast of air will be substantially increased once the milk plug has past the pressure regulator 78 as there will then be little restriction to flow in the flowpath and the air speed will increase substantially. After that a small quantity of the plug of milk from the next cow is allowed to wash through this reverse flow route to move onwards any loosened debris before the valves 140, 142 are again operated to direct flow along pipe 144 through the filter 136 and out along pipe 146 to valve 142.

In a variant construction, the filter is made in the form of a disc, and the pipes 144 and 146 enter at either side of the disc, so that flow which does not pass through the filter is directed across the top of it.

Collection in Receiving Vessels

Figure 18:
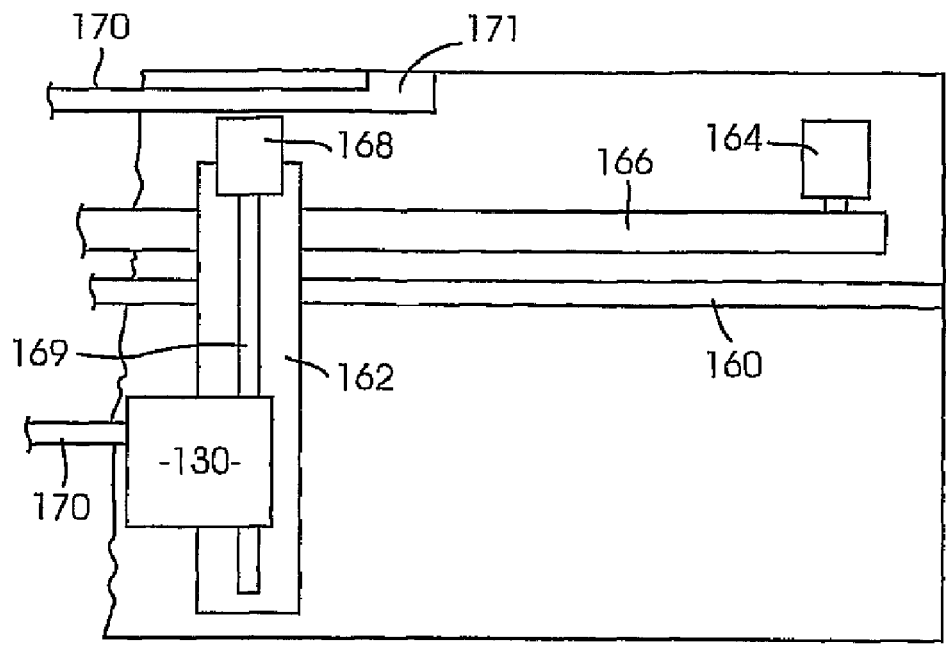
FIG. 18 is a plan view which diagrammatically shows part of a transport device at the extraction point.

The pipes 144,146,151 leading to and from valve 130 are flexible, and this valve 130 is carried on a transport mechanism diagrammatically illustrated in FIG. 18.

This mechanism has a bar 160 defining a longitudinal direction. A carriage 162 is mounted on this bar and is also supported by a wheel to hold it level. The carriage is movable to and fro along the bar by a stepper motor 164 operating a drive belt 166. On the carriage a stepper motor 168 turns a screw 169 which serves to move the valve 130 to and fro on the carriage in a lateral direction perpendicular to the bar 160.

A flexible enclosure 170 leads the pipes 144,146,151 from a stationary point 171 to the valve 130.

Transport mechanisms of this general type are well known. Here the transport mechanism is used to position the discharge tube 154 over an array of receiving containers, so that each sub-sample is delivered into a separate receiving vessel.

The transport mechanism could also be used to reposition the valve 130 and discharge tube 154 between successive sub-samples from the same plug of milk, if it should be desired to take more than one sub-sample for separate tests.

Figure 19:
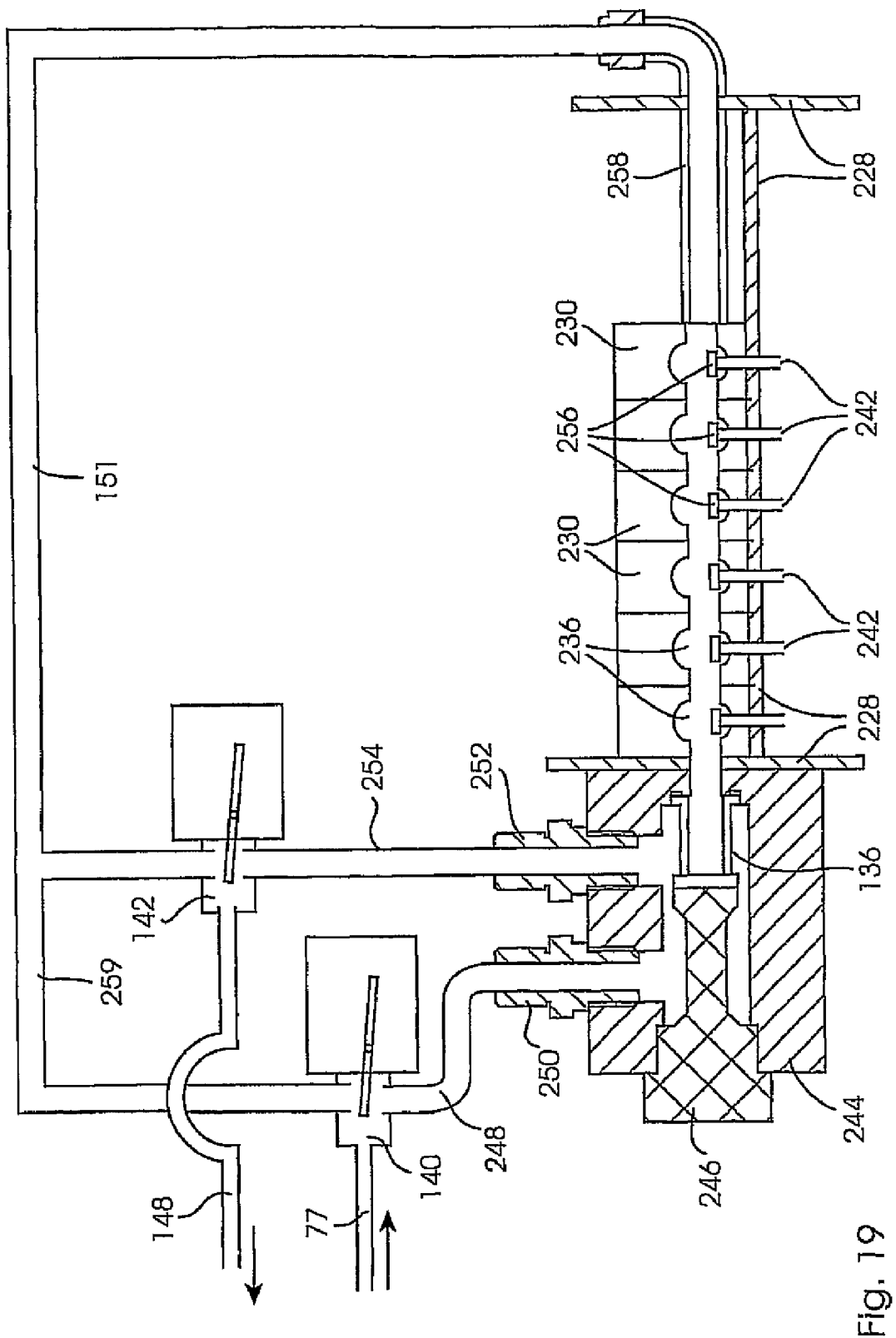
FIG. 19 is a diagram of yet another form of extraction point.
Figure 21:
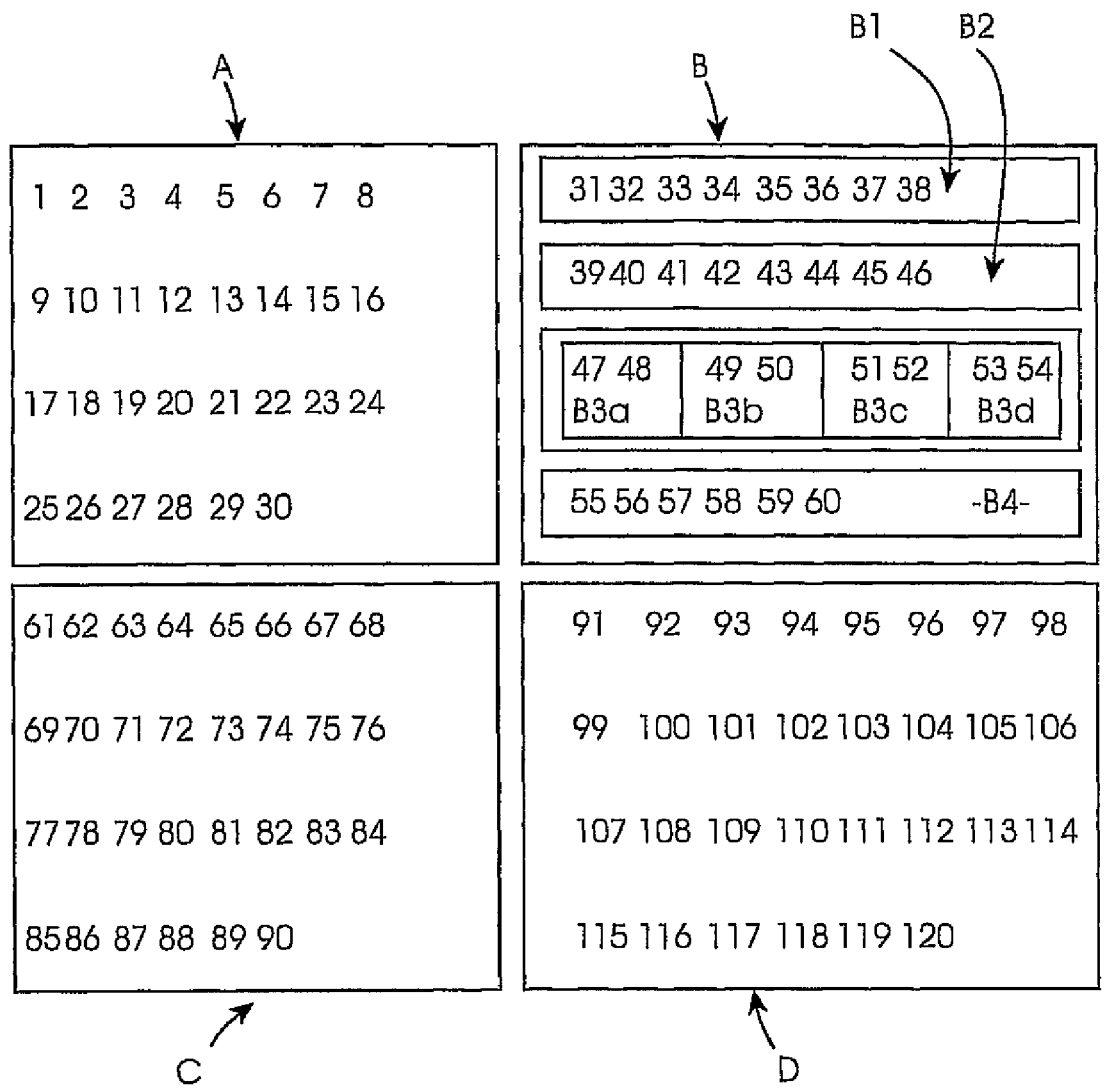
FIG. 21 is a diagrammatic illustration of Example 1, showing notional division of a dairy herd into first and further subsets.
Figure 22A:
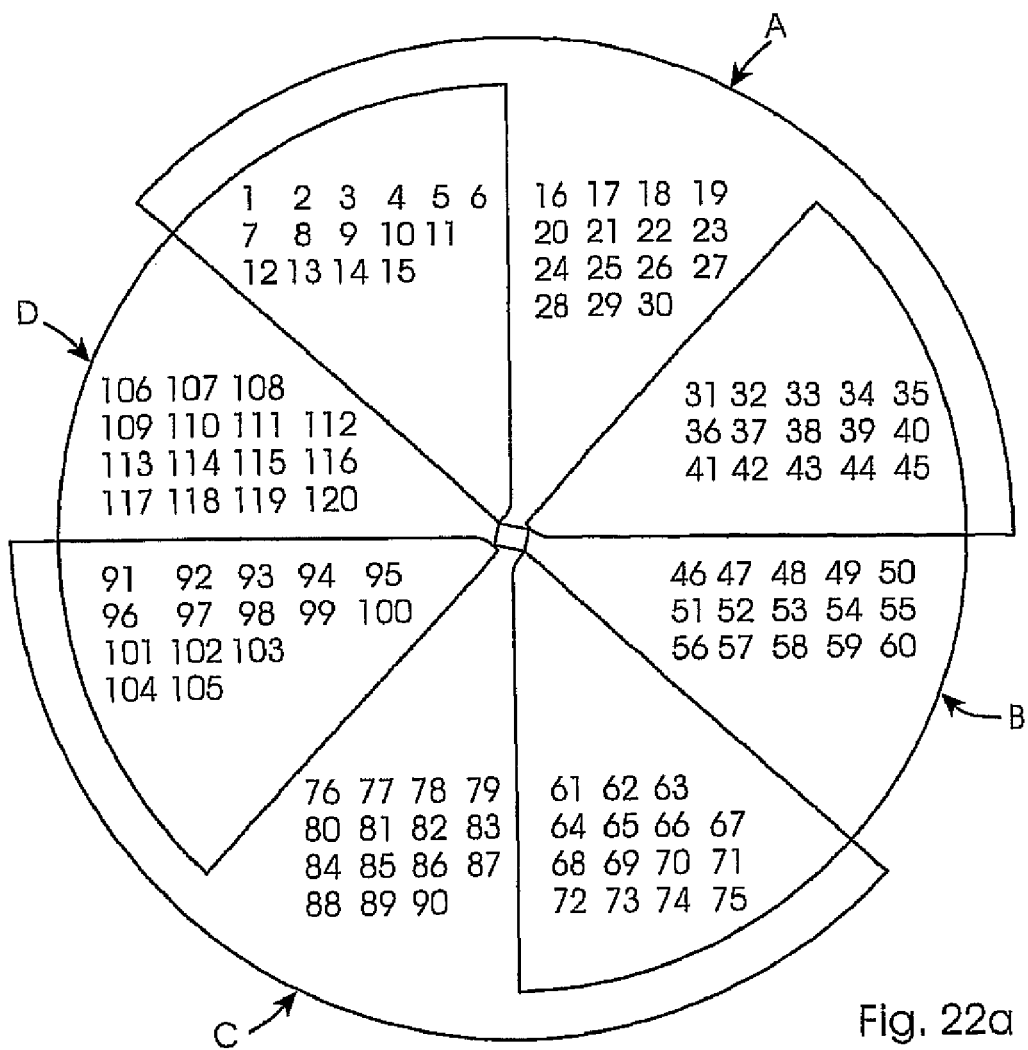
FIG. 22a is a diagrammatic illustration of the first stage of Example 2, showing division of a herd into overlapping first subsets.
Figure 22B:
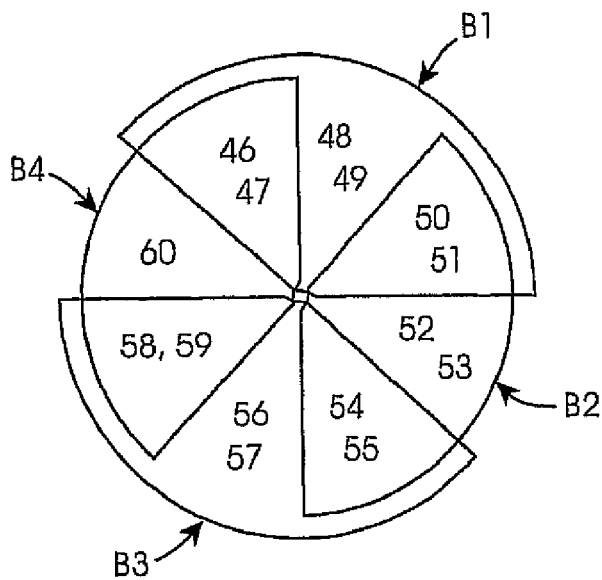
FIG. 22b is a diagrammatic illustration of the next stage of Example 2.

FIG. 19 illustrates a further possible valve arrangement at the extraction point. The arrangement has considerable similarity to that shown in FIGS. 16 and 17 (and the same reference numerals are used where appropriate) but the single outlet valve 130 with outlet tube 154 is replaced by a series of outlet valves 230 located one next to the other on a supporting structure 228. The out let valves 230 provide a series of outlet tubes 242. Each of outlet valves 230 is operated by a solenoid actuator, (not shown).

At one end there is a block 244 defining a chamber accommodating a milk filter 136 which is held in place within the block 244 by a removable element 246. Milk flows in along a pipe 77 to solenoid actuated valve 140. A flexible pipe 248 leads from valve 140 to an inlet 250 to the chamber within the block 244. A second port 252 from the block 244 is connected by flexible pipe 254 to solenoid actuated valve 142.

Each of the outlet valves 230 has a valve chamber 236 within which a solenoid actuated valve member 256 is movable to open or close the bottom outlet tube 242 which has a narrow bore. These outlet valves 230 are mounted one beside the other so that their valve chambers 236 are connected one to the next. (As an alternative these outlet valves could be formed within a single block so that the valve chambers are parts of a manifold within a single block). The interior of the milk filter 136 within the block 244 is connected through a hole in the supporting structure to the valve chamber 236 of the adjacent outlet valve. The outlet valve furthest from the block 244 is connected by a pipe 258 leading through the supporting structure 228 to flexible pipe 151 which leads back to the valve 142 and also connects to a pipe 259 leading to the valve 140.

Operation is directly analogous to operation of the arrangement shown in FIGS. 16 and 17. A flow of milk arriving along the pipe 77 is directed by valve 140 to the pipe 248 leading to the block 244. While the leading portion of a plug of milk is passing, valve 142 is set to open pipe 254 and so allow all the milk to flow out of block 244 through the port 252 to the valve 142 and out along the outlet pipe 148.

After the leading portion of a plug of milk has passed, the valve 142 is operated to block the pipe 254 and instead allow milk to pass through the filter 136 and then through the connected valve chambers 236 of the valves 230 into the pipe 258 and then into the pipe 151 leading back to the valve 142 from which the milk leaves along pipe 148.

The valve member 256 of any one of the valves 230 can be operated once or repeatedly to take a subsample out of the milk flow. Two or more valves 230 can be opened if duplicate or multiple subsamples are required. By providing multiple outlets 242 through which subsamples of milk can be delivered, it is possible to reduce, or avoid, the need for mechanical movement of the outlet valves relatively to receptacles beneath then. For example the illustrated arrangement with six outlet valves 230 could be used to discharge individual subsamples into each of six receptacles after which these could be replaced with another six receptacles. The number of outlet valves 230 can of course be varied to provide more or fewer than the six valves illustrated here.

The arrangement for flushing the milk filter 136 is directly analogous to that described for FIGS. 16 and 17. From time to time the valves 140,142 are operated to cause milk to flow in the reverse direction along pipe 151 and through the valves 230 to flush any debris off the filter 136. Alternatively the filter 136 can be flushed with air arriving along the pipe 77 after a plug of milk has passed through this extraction point. At this stage, compressed air can also be discharged briefly through the outlets 242 from the valves 230 to blow any residues of milk out of these.

Testing

The testing of subsamples after they have been collected in the manner described above is a subsequent stage. The ability to collect samples in a convenient manner at a single location—the extraction point 80—facilitates testing of samples on a farm. It will encourage more frequent testing, especially assaying the collected subsamples for the concentrations of progesterone. A low concentration of progesterone indicates that a cow is once again ready to breed.

Collection of subsamples also facilitates testing for mastitis and some diseases of cattle.

Mastitis, and some other diseases of cattle, can be detected by assays for specific substances, and the concentration of substance signifying a positive result in a test of milk from one animal is very much greater than the concentration normally encountered.

Mastitis is an inflammation of the udder of the animal usually caused by bacterial infection. In addition to pain and discomfort experienced by the animal, it leads to loss of milk yield, reduction in milk quality and a necessity to discard milk from animals with mastitis while they are being treated with antibiotic.

The problem of detecting mastitis is a longstanding one. An article by Hillerton ("Detecting Mastitis Cow-side", J Eric Hillerton, National Mastitis Council Annual Meeting Proceedings (2002)) reviewed the problem and diagnostic techniques which were known at the time. He commented, in particular on a need for mastitis detection and prediction systems, in the context of fully automated milking. At present, even in conventional milking parlours where the cows are seen by a cowman at each milking, mastitis detection is not always achieved as promptly or reliably as would be desirable.

Somewhat prior to the date of Hillerton's article it was discovered that mastitis leads to the appearance of certain proteins in the milk, notably a protein termed amyloid A. These are generally not detectable in milk from animals without mastitis or occur at low concentrations. These proteins are produced as part of the mammalian body's response to inflammation, and are included in a category of proteins which have been referred to as "acute phase proteins". Such proteins also appear in other body fluids as part of the body's response to tissue injuries, including inflammation. Immunological tests for the presence of these proteins in milk have been devised and published.

WO-A-01/14580 discloses an immunological assay for amyloid A in biological fluids and states that the test can be applied to the detection of mastitis by measuring the amount of amyloid A protein in a milk sample. Experimental results in this document show that the amount of amyloid A in milk from a cow with mastitis is very much greater than the small amounts (and sometimes no detectable amount) in milk from cows without mastitis. Thus, the concentration of amyloid A associated with a positive result (i.e. finding of mastitis) is very much greater than the concentration in healthy cattle.

An assay for amyloid A in milk is available from Tridelta Developments Limited as part of their range of tests for acute phase proteins in biological fluids. The publicity of this company includes recognition of a potential use of their test in milk quality testing and a brief statement, without further detail, that testing can be automated during the milking process. Other publicity from this company mentions their hope of developing a test strip to be used while milking.

Testing for amyloid A is not the only immunological test for mastitis. WO-A-01/27631 discloses an immunological assay for haptoglobin in milk using a haptoglobin-specific antibody. This is disclosed as a means to predict or detect mastitis or sub-clinical mastitis and/or to test the quality of milk in dairy cattle. This document points out that the test is highly specific and does not give false positive results.

These publications thus recognised various possible uses of tests for substances which are indicators of mastitis, including the possibility of early diagnosis before symptoms can be observed but they contained no discussion of how this might be put into practice.

If a test procedure is used regularly, as for example in routine testing of milk to check that a predetermined substance is absent or is below a minimum concentration, the cost of testing may become a significant issue even though positive results are found infrequently.

I have recognised that a test for a predetermined substance can be put to use not only to detect the substance but also to identify its source without incurring the full cost of testing every milk subsample individually. In my procedure, the animals constituting an overall number which is being tested are notionally subdivided into a collection of subsets of the total number. Milk from the animals constituting each subset is mixed and a test is carried out on the mixed milk, which reveals whether the substance of interest is present in milk from the animals in the subset. At least some of the overall number of animals are notionally divided into different subsets and milk from the animals within each of these further subsets is also mixed and tested. These further subsets are not identical to any of the first subsets but overlap with them or lie within them. They may overlap with each other.

By following such a procedure in which the tests are applied to mixed milk from subsets of the overall number of animals, it is possible to identify an animal whose milk contains the substance or possibly to identify a small number of animals whose milk can then be tested individually (or which can be examined in some other way, if so desired) with the total number of tests being less than would be required if every subsample was tested individually.

So, according to one definition, a method of identifying an animal giving milk containing a predetermined substance from within an overall number of animals, comprises:

a step of mixing milk from pluralities of animals which pluralities are a collection of first subsets of an overall number such that every animal is a member of at least one of these first subsets, so as to form first test volumes of mixed milk each of these test volumes being associated with a said first subset;

one or more further steps of mixing milk from one or more other pluralities of samples each of which is a further subset of the overall number, to form one or more further test volumes of mixed milk each further test volume being associated with a further subset, such that each further subset is not identical to that first subset but includes at least one animal which is a member of a said first subset;

testing each of the test volumes for the said substance and optionally also testing milk some individual animals for a substance of interest at a concentration above a threshold value, the allocation of animals to first and further subsets and the corresponding mixing of said milk in first and further test volumes being such that an individual animal giving milk containing the said substance is identified with a total number of tests which is less than the overall number of animals.

The threshold value is a minimum concentration for a test result to be regarded as a positive. It may be the lowest concentration detectable by the test, or it may be a greater concentration. It is not essential that the same threshold value is utilised in every test.

This method may be utilised to identify a single animal giving milk containing the substance or it may be utilised to identify a small group of animals, one of which contains the substance, after which the individual animal whose milk contains the substance is picked out from the group in some other way. Consequently the method is more generally defined as a method of identifying a number X of animals (where X may be one or greater than one) at least one of which animals gives milk which contains the substance of interest, out of a larger overall number Y of animals, comprising:

a step of mixing milk from pluralities of animals which pluralities are a collection of first subsets of the overall number Y such that every animal is a member of at least one of these first subsets, so as to form first test volumes of mixed milk each associated with a said first subset;

one or more further steps of mixing milk from one or more other pluralities of animals each of which is a further subset of the overall number Y, to form one or more further test volumes of mixed milk each associated with a further subset, such that each further subset includes at least one animal included in a said first subset but is not identical to a first subset, testing each of the test volumes for said substance at a concentration above a threshold value, the allocation of animals to first and further subsets and the corresponding mixing of milk in first and further test volumes being such that identification of the number X of animals, at least one of which gives milk containing said substance is accomplished through a total number of tests which is less than the overall number Y divided by the number X.

Generally the first subsets mentioned above will contain more than X animals. The further subsets may well also contain more than X animals.

It is envisaged that the overall number of animals Y may be greater than 50. It may well be greater than 80 or 100. Numbers may be considerably above this for example, 200 or 250.

The number X of animals which are identified as including at least one animal whose milk contains the said substance is preferably less than 10, better no greater than 5 or 6.

In one form of the inventive procedure each of the further subsets is itself contained within one of the first subsets. In this form of the procedure each subset where the substance is detected is notionally divided into smaller subsets. Mixed milk from animals in each of these progressively smaller subsets is tested. If necessary one or more of the smaller subsets is notionally sub-divided again until the animal whose milk contains the substance of interest is identified.

In a second form of the inventive procedure the overall number of animals is notionally subdivided to create the collection of first subsets and also notionally sub-divided in at least one different way to create at least one more collection of further subsets of the overall number of animals, such that every animal is a member of at least one further subset. Mixed milk from the animals in each first and each further subset is tested, preferably at the same time and a animal whose milk contains the substance is identified by observing which animal is included in a plurality of intersecting subsets whose corresponding test volumes have tested positive for the presence of the substance.

Notional division of the overall number of samples into subsets may or may not lead to subsets of equal size. The overall number of animals may be such that one subset has to be smaller than others.

The substance of interest which is being detected may be a polypeptide or protein; amyloid A already mentioned is an example of this. The substance may be a hormone—which itself may be a polypeptide. A further possibility is to test for the presence of mRNA associated with a protein of interest. For instance WO-A-01/14580 discloses assaying for mRNA associated with synthesis of a protein which is produced as a response to mastitis.

The substance of interest which is being detected may be an antibody which has been produced in response to infection. For example, if a milk subsample contains antibodies to a virus, that is an indication that the animal which is the source of the sample has at some time been infected with that virus.

The test which is carried out to detect the substance of interest may rely on immunological binding (i.e. binding of an antibody or antibody fragment to an antigen) to detect the substance of interest. The test may use antibodies or parts of antibodies which bind specifically to the substance of interest. Such antibodies are likely to be monoclonal.

If the substance of interest is an antibody, the test may utilise an antigen to the antibody as a way to cause the antibody to bind, or it may use an antibody which has binding affinity for the antibody of interest. Tests which rely on immunological binding frequently are immunosorbent assays in which an antibody, antibody fragment or antigen is immobilised on a solid phase. The test may be an enzyme linked immunosorbent assay (ELISA). Various forms of enzyme immunoassay are known. A brief discussion of them is found in "Pharmacology" by H. P. Rang and M. M. Dale, 2nd Edition 1991, Page 66. Typically, such an assay utilises immobilised antibodies or antigen to bind the substance which is being detected and then determines the amount of substance which has been bound using an enzyme which catalyses a chemical reaction which leads to a coloured product. The concentration of coloured product can be determined with a colorimeter which measures absorption of light at a specified wavelength.

Such an assay may be arranged to give a numerical result representing the concentration of the substance of interest or merely to detect its presence above a minimum amount. If the test gives a numerical result representing concentration, it will be necessary to decide on a threshold value above which the test is considered to have given a positive result signifying detection of the said substance. The threshold value should generally be chosen to minimise false results—both false positives and false negatives.

As well as the amyloid A test for mastitis mentioned above, tests are already available for testing samples taken from bulk quantities of milk, for example to detect antibodies to infectious bovine rhinotracheitis (IBR), bovine viral diarrhoea (BVD) and Leptospira hadjo.

Such tests are currently used to screen milk from an entire herd. My procedure could be used to apply these tests after collecting subsamples of milk as described above yet without the full cost of testing every individual subsample of milk.

Returning to mastitis as the prime example, a dairy farm may well have in the order of 100 cows, milked twice daily, with milk pumped into a bulk tank for collection.

I expect that new incidences of mastitis could be expected to occur in the order of 50 new cases, per 100 cows, per year. An immunological test can detect the onset of mastitis before the appearance of any symptoms which can be seen by a cowman. So, with a herd of about 100 cows, there will be in the order of 50 occasions in the year when it will be desirable to identify an animal with a new incidence of mastitis before there are any observable clinical symptoms. On a very few occasions there will also be two or perhaps three animals with new incidences of mastitis at the same milking. I consider it desirable that a testing procedure should be such that it is not defeated when there is more than one animal with mastitis at the same time. My procedure is able to identify affected animals even when there is more than one cow with mastitis, although it would be less helpful in the highly unlikely event that more than three cows have mastitis.

Preferably the indicator substance of interest when screening for mastitis is amyloid A protein. In that case the antibodies should bind to the form of amyloid A protein which is produced in the mammary gland and occurs in milk of the relevant species when mastitis is present. Mammary amyloid A is not identical to amyloid A produced elsewhere in the body and found in serum. It can be expected that inflammation elsewhere in the body will lead to some serum amyloid A appearing in milk and conversely mastitis may lead to some mammary amyloid A appearing in serum. When testing for mastitis it will not matter whether the antibodies have binding affinity to forms of amyloid A which occur in other body fluids because what is required is to detect the greatly increased concentration of amyloid A which occurs in milk when mastitis develops. So for example a test for use with cattle could employ antibodies which have binding affinity to bovine serum amyloid A and also to bovine mammary amyloid A.

Alternatively if antibodies were available which selectively bind mammary amyloid A rather than serum amyloid A it would be possible to use these.

There is more than one possibility for testing a batch of samples. One is to take milk from every sample in the batch, and test the resulting mixed milk for the substance of interest. This is advantageous in that the entire batch may be cleared with a single test leading to a negative result. However, for this to be a viable possibility, the test needs to be sufficiently sensitive to be capable of detecting substance of interest occurring in one sample, even after dilution with approximately equal amounts of milk from every other sample in the batch. Also the expected concentration of the substance in an affected sample must be much greater than any background concentration in any unaffected samples, so that a batch containing one affected sample can be distinguished from the normal background level.

Another possibility is to carry out the first stage of a method as defined above, sub-dividing the batch of samples into first sub-sets of the overall batch, mixing milk from the pluralities of samples in each subset, to form respective first test volumes of mixed milk associated with each first subset, and then testing these first test volumes.

If all give negative results, the entire batch is cleared. If a positive result occurs, the procedure can then be continued, in order to identify the individual milk sample or a group of samples, which is smaller than the first subset, in which the substance of interest is present, This approach requires more tests to clear a batch, but does not require such a large difference in concentration between an affected sample and any background concentration.

In the examples which follow, some specific embodiments of procedure which milk subsamples are tested for amyloid A will now be described in further detail, and with reference to FIGS. 21 to 24 of the drawings.

The first two Examples are progressive procedures, in which further tests are carried out in response to initial results. The second two Examples make use of concurrent testing, and can reach a final result more quickly, which is advantageous because the affected cow can be treated more promptly.

EXAMPLES

The following examples given as illustration all relate to herds of dairy cattle. The test which is employed is similar to that described in WO 01/14580 in which milk is assayed for an amyloid A protein. The assay is carried out in wells of a microtitre plate. Plates and reagents for this test are available from Tridelta Developments Ltd, P O Box 14, Greystones, Co. Wicklow, Ireland.

Example 1

A herd consists of 120 cows in milk. In this example they will be referred to by number as cow no 1, cow no 2, and so on. It is assumed that no cow is already know to have mastitis—or that any cow already known to have mastitis has been temporarily excluded for treatment. During each milking a small sample (which in itself is a subsample) of milk from each cow (for example 5 ml) is taken and placed in a vial. The remainder of the cow's milk goes into the bulk tank awaiting collection.

Following milking, smaller subsamples are taken from every sample collected, mixed together, and tested for amyloid A. If none is detected (more precisely, the concentration of amyloid A is below a chosen threshold value) the rest of the sample milk is discarded. If mastitis is already known to be present, this single test could be applied to mixed milk of all cows which appeared to be mastitis-free at the last milking, so as to check for any new incidence of mastitis.

If amyloid A is detected, further testing is commenced, as will now be illustrated.

It will be assumed that cow no 48 has an incidence of mastitis.

The sample vials are divided into four groups of 30 vials. Small subsamples are taken out of the vials containing milk from cows 1 to 30 and mixed together in a vial labelled A. Likewise, small subsamples are also taken out of the vials of milk collected from cows 31 to 60 and mixed in a vial labelled B, while milk from cows 61 to 90 and from cows 91 to 120 is mixed in vials labelled C and D respectively. Thus at this stage there are four vials each containing milk from 30 cows constituting one of four mutually exclusive first subsets of the herd. This is shown diagrammatically in FIG. 1 in which each of these four subsets is surrounded by a rectangular box. The mixed milk in each one of these four vials is tested for amyloid A and it is found that amyloid A is present in vial B only.

Having now identified mastitis in the subset which is cows 31 to 60, further subsamples are taken from the vials containing milk from cows 31 to 38, and mixed in a vial labelled B3. Similarly, subsamples of milk from cows 39 to 46, 47 to 54 and 55 to 60 are mixed in vials B2, B3 and B4 respectively. (Vial B4 contains mixed milk from only six cows). Thus there are now four further subsets each of which is smaller than but contained entirely within, the first subset B composed of cows 31 to 60. FIG. 1 illustrates these four subsets within rectangular boxes inside subset B. The mixed milk in each one of these four vials B1 to 134 is tested for amyloid A. It is found that amyloid A is present in vial B3 only.

It will be seen that in vial B2 the subsample of milk from cow 48 was diluted with subsamples from seven other cows, whereas in vial B the subsample of milk from cow 48 was diluted with subsamples from twenty-nine other cows. It may therefore be appropriate that the threshold value of amyloid A concentration taken as a positive result when testing vial B2 is higher than the threshold when testing vial B.

It may be a matter of choice for an individual farmer, on reaching this stage where a small number of cows X is identified as a group in which one has mastitis, whether to continue testing to single out the affected cow or whether to wait and inspect all cows in the small number at the next milking.

Assuming testing is continued, in a third stage, yet further subsamples are taken from the vials containing milk from cows 47 and 48, and mixed in a vial labelled B3*a*. Similarly, subsamples of milk from cows 49 and 50, 51 and 52, 53 and 54 are mixed in vials B3*b*, B3*c* and B3*d* respectively. Thus there are now four even smaller subsets each of which is two cows within the first subset B and within the smaller subset B3. The mixed milk in each one of these four vials B3*a* to B3*d* is tested for amyloid A. It is found that amyloid A is present in vial B3*a* only and in a final stage milk from cows 47 and 48 is tested individually.

It is found that milk from cow 48 contains significant concentration of amyloid A, identifying this cow as having mastitis. The cow can be isolated from the remainder of the herd and treated with antibiotic.

Milk from other cows in the herd contains only traces of amyloid A or none at all, so far as can be detected.

Identifying this cow from the total of 120 cows required 14 tests, carried out in four stages—three stages with four tests and a final stage which is the two individual tests of milk from cows 47 and 48.

In the event that more than one cow simultaneously has an incidence of mastitis, the successive stages of testing will give more than one positive result and additional tests will be required in later stages.

For example assume that cows 48 and 119 both have an incidence of mastitis. At the first stage of testing, amyloid A is detected in vials B and D.

The second stage of testing includes the subsampling into vials B1 to B4 exactly as described above. It also includes directly analogous subsampling within set D. Subsamples are taken from the vials containing milk from cows 91 to 98, 99 to 106, 107 to 114 and 115 to 120 and mixed in vials labelled D1, D2, D3 and D4.

The mixed milk in each one of these four vials D1 to D4 is tested for amyloid A. It is found that amyloid A is present in vial D4.

So at the third stage, concurrently with the subsampling into vials B3*a* to B3*d*, milk from cows 115 and 116, 117 and 118, 119 and 120 is subsampled into three vials D4*a*, D4*b* and D4*c*. Testing reveals amyloid A in vial D4*c*. At the final stage, milk from cows 119 and 120 is tested individually.

Thus with this procedure, a second simultaneous incidence of mastitis requires some additional tests, but no additional stages of testing. A third cow with mastitis could be identified in analogous fashion, again with some additional tests in the later stages of testing. Even with three incidences of mastitis, (which will be a very rare event) no additional stages would be required. The overall number of tests would at most be four in the first stage, twelve in the second stage, twelve in the third stage and six in the final stage of testing milk from individual cows, a total of 34 in all.

In a variation of this example, the initial single test of subsamples from every sample is not carried out. Instead the routine procedure after every milking begins at the next stage, taking subsamples out of the vials of milk from cows 1 to 30 and mixing these in vial A, and so on as described above with reference to FIG. 1. The mixed milk in vials A, B, C and D is tested. If none of them is found to contain amyloid A above a chosen threshold value, the procedure is terminated and all milk samples are discarded. If amyloid A is found, the procedure is then continued as described above.

Example 2

This example is similar to Example 1, but a more complex procedure allows the total number of stages of tests to be reduced further, if there is only one incidence of mastitis. As in Example 1, samples are taken at each milking and combined subsamples are mixed and tested to check whether there is any new incidence of mastitis.

Again it will be assumed that cow no 48 has a new incidence of mastitis.

In the first stage of testing there is division into a collection of first subsets which overlap. As shown diagrammatically in FIG. 2a, small equal subsamples are taken out of the vials containing milk from cows 1 to 45 and mixed together in a vial labelled A. Likewise, small subsamples are also taken out of the vials of milk collected from cows 31 to 75 and mixed in a vial labelled B, while milk from cows 61 to 105 is mixed in a vial labelled C. Also, milk from cows 91 to 120 plus cows 1 to 15 is mixed in a vial labelled D. Thus at this stage there are four vials A, B, C and D each containing milk from 45 cows constituting one of four overlapping first subsets of the herd. The mixed milk in each one of these four vials is tested for amyloid A and it is found that amyloid A is present in vial B only. This shows that the cow affected with mastitis is in a group of 15 cows consisting of cows 46 to 60, because milk from these cows was subsampled into vial B only.

It should be appreciated that if the cow affected with mastitis was in the group consisting of cows 31 to 45 amyloid A would be detected in both vials A and B. Analogously if the affected cow was in the group consisting of cows 71 to 75 amyloid A would be detected in both vials B and C. If the affected cow was in the group consisting of cows 1 to 15, amyloid A would be detected in both vials A and D.

Thus, this choice of four overlapping subsets effectively defines eight subsets, four of which are represented in one vial only and four of which are represented in a pair of vials.

After finding amyloid A in vial B only, the procedure at the next stage is that further subsamples are taken from the vials containing milk from cows 46 to 51, and mixed in a vial labelled B1. Similarly, subsamples of milk from cows 50 to 55, and 54 to 59 are mixed in vials B2 and B3 respectively. Subsamples of milk from cows 46,47 and 58 to 60 are mixed in vial B4. Thus there are now four further overlapping subsets as illustrated in FIG. 2b. None of them is identical to any of the first subsets A, B, C or D but they all lie within first subset B. The mixed milk in each one of these four vials B1 to B4 is tested for amyloid A. It is found that amyloid A is present in vial B3 only. That shows that the affected cow is either no 48 or no 49.

Finally, milk from cows 48 and 49 is tested individually, showing that it is cow no 48 which has mastitis.

Thus, identification of cow 48 as the affected cow required only 10 tests and only three stages of testing. However, if amyloid A is detected in more than one vial at the first stage of testing, it may be because there is a single incidence of mastitis in one cow whose milk has been subsampled into two of the vials or it may arise because there are two incidences of mastitis.

This can be resolved by additional tests. For example, assume that cow 35 (but no other cow) has an incidence of mastitis. At the first stage of testing, amyloid A will be detected in vials A and B because both of these contain milk from cows 31 to 45.

The presence of amyloid A in both of these vials is most likely to result from mastitis in only of the cows 31 to 45. However, it could possibly arise from mastitis in one (or more) of cows 16 to 30 and mastitis in one (or more) of cows 46 to 60.

So, at the next stage of testing subsamples of milk from cows 31 to 36, 35 to 40, 39 to 44, and 45, 31 and 32 are put into respective vials in a procedure which is the same as illustrated by FIG. 2b. At the same time milk from cows 16 to is subsampled into a vial while milk from cows 46 to 60 is subsampled into another vial. All six vials are tested for amyloid A. The result is that amyloid A is found in milk from cows 31 to 36 and from cows 35 to 40. In the next stage milk from cows 31 to 34 is subsampled into a vial, milk from cows 37 to 40 is subsampled into another vial and these are tested for amyloid A while milk from cows 35 and 36 is tested individually. Amyloid A is found only in milk from cow 35.

Thus, this procedure requires no more than 14 tests in three stages of testing to identify one affected cow and confirm that there is only one cow with mastitis.

If there were in fact two or more instances of mastitis, this would be discovered but further testing would be needed to identify the affected cows.

Example 3

This example uses a procedure which defines more than one collection of subsets of the whole herd.

A herd consists of 64 cows in milk. As in Example 1, after each milking, mixed milk is subjected to a routine test for amyloid A to detect any new incidence of mastitis. This routine test may be a single test on a mixture of milk from all cows, or it may be the testing of eight first subsets in the first stage of the procedure described below.

It will again be assumed that cow no 48 has an incidence of mastitis.

The sample vials of milk are arranged in a square array as shown in FIG. 3 of the drawings. Small equal subsamples are taken out of the vials containing milk from cows 1 to 8 and mixed together in a vial designated R1. Likewise, small subsamples are also taken out of the vials of milk collected from cows 9 to 16 and mixed in a vial designated R2, and so on up to vial R8 containing subsamples of milk from cows 57 to 64. As can be seen in FIG. 3, this mixes milk within each row of the square array. There are eight vials each containing milk from one of eight mutually exclusive first subsets of the herd.

At the same time, small, equal subsamples of milk are taken from the vials forming each column of the square array and mixed in vials designated C1 to C8. Thus for example the vial designated C1 contains milk collected from cows 1, 9, 17, 25, 33, 41, 49 and 57. This creates eight second subsets, which are mutually exclusive but which overlap with first subsets because each second subset includes one cow from each of the first subsets.

The mixed milk in all sixteen vials is tested for amyloid A and it is found that amyloid A is present in vials R6 and C8 demonstrating that cow no 48 has mastitis. This example required sixteen tests, but all tests can be carried out simultaneously so that a complete identification of the affected cow is obtained more quickly than with Example 1 or Example 2. The result is more certain to be available prior to the next milking, when the cow can be examined manually and treated.

Whether the 64 sample vials taken while milking the cows are physically laid out in a square array before subsamples are taken from them, or whether the square array remains purely imaginary is a matter of choice, of course. All that is required is that an operator or automatic machinery takes subsamples from the correct vials.

In the event that more than one cow has an incidence of mastitis, the testing of the 16 vials will not give clear identification of the affected cows and further testing will be required. For example assume that cows 28 and 48 both have an incidence of mastitis. At the first stage of testing, amyloid A is detected in vials r4, r6, c4 and c8. This identifies cows 28,32,44 and 48 as possibly having mastitis. So, a second stage of testing is required in which milk from these four cows is tested individually. In the event of three incidences of mastitis at the same time, up to 9 cows might be identified as possibly having mastitis. This would be a rare occurrence. The three cows within the group of nine possibles could be identified by testing subsets of two or three, followed by testing individually as required, but it would probably be preferred to test all nine individually, since this is expected to be a very infrequent event and the result would be obtained more quickly by testing individually.

The procedure of this Example could be expanded for a larger herd by using a square or rectangular assay with more rows and columns. A herd of 120 cows would require an 11×11 array, with one blank space, and so would need 22 tests. A herd of 90 cows would require a 9×10 rectangular array. The overall number of cows may not fit exactly into all cells of a square or rectangular array, in which case a few blank spaces are left.

Example 4

The procedure of the previous example can be reduced to 12 simultaneous tests in the first stage of testing. The sample vials from the 64 cows are notionally arranged as four square arrays of 16 vials. (This is equivalent to a 4×4×4 cube). Subsamples of milk from the first row of every array (i.e. cows 1 to 4, 17 to 20, 33 to 36 and 49 to 52) are taken and mixed in a single vial labelled R1. Likewise subsamples from the other rows are taken and mixed in vials R2,R3 and R4. This defines four mutually exclusive first subsets each consisting of 16 cows.

Subsamples of milk from the first column of every array are taken and mixed in a vial designated C1. Likewise subsamples from the other columns are taken and mixed in vials C2, C3 and C4. This defines four mutually exclusive second subsets each consisting of 16 cows.

Subsamples of milk from every vial in the first square array are taken and mixed in a single vial designated V1. Likewise subsamples from every vial in each of the other three square arrays are taken and mixed in a respective vials V2, V3 and V4. This defines four mutually exclusive third subsets each consisting of 16 cows.

The first second and third subsets overlap in that every cow is a member of one first subset, one second subset and one third subset. When the twelve vials R1-R4, C1-C4 and V1-V4 are tested, amyloid A is detected in vials R4, C4 and V3 indicating that cow 48 has mastitis.

In the event that more than one cow has an incidence of mastitis, the testing of the 12 vials will (as in Example 3) not give clear identification of the affected cows and further testing will be required. For example assume that cows 27 and 48 both have an incidence of mastitis. At the first stage of testing, amyloid A is detected in vials R3, R4, C3, C4 V2 and V3. This identifies eight cows as possibly having mastitis. So, in a second stage of testing milk from these eight cows is tested individually. In the event of three incidences of mastitis at the same time, the number of cows which might be identified as possibly having mastitis is fairly large and it would be desirable to identify the affected cows within the group of possibles by using the procedure explained in Example 1.

The procedure of Example 4 can be extended to a larger herd of up to 125 cows by assigning the sample vials to five square arrays of 25 vials. A total of 15 tests will then be required.

Example 5

In the course of research work by a third party, 21 cows were picked out from a larger herd and the milk from these cows was sampled once a day and tested for the presence of amyloid A. Data was collected over a period of 33 days. During this experimental period three cows developed clinical symptoms of mastitis (which was an abnormally high incidence). When this happened they were removed from the test group while they were treated with antibiotics.

When the test was carried out the result was a numerical score (in arbitrary units) which was however proportional to the concentration of amyloid A in the tested milk.

It was apparent that during the test period the milk of some cows contained no amyloid A or did so only very infrequently and for a short time. A few cows were observed to have a small concentration of amyloid A in their milk throughout the duration of the experiment.

Initial inspection of the data shows that if equal amounts of milk from all cows in the group (not including any cows removed for treatment) had been mixed together and tested for amyloid A, the score in the test would usually be above 200 but less than 500 except on days when there was a new incidence of mastitis. Any cow which developed mastitis and was removed for treatment gave a score of 40,000 or more in at least one test of the milk from that cow.

It can be calculated that if a herd contained 100 cows with an average amyloid A score between 150 and 450, and if one cow in the herd developed mastitis so that the amyloid A score in milk from that cow reached 40,000, then a test for amyloid A carried out on a mixture which contained equal amounts of milk from every one of the 100 cows in the herd would lead to a score between 540 and 850 so that the presence of mastitis somewhere in the herd could be detected by a single test with a threshold value of 500.

If a herd contained 200 cows, and the routine test consisted of testing mixed milk from subsets of the overall herd, then an incidence of mastitis leading to an amyloid A score of 40,000 for milk from the affected cow would lead to a score of at least 800 when testing mixed milk from a subset of up to 50 cows.

Consequently, such an incidence of mastitis could be detected by testing mixed milk from subsets, with a threshold value in the test set at 500, 600 or 700, if (i) the average amyloid A score for the remaining cows lay in a range from zero to 450 and (ii) the maximum number of milk samples making up a subset was 50 or less.

A paper exercise was carried out in which the data previously collected by the third party for the group of 21 cows was examined making the assumption that 1. On each day equal portions of milk would be taken from subsamples of milk of every cow believed to be healthy (i.e. not already excluded) and tested for amyloid A.

2. If the resulting score was below a threshold value there would be no further investigation that day.

3. If the score was above the threshold value, there would be further testing in accordance with the procedures in any previous Example so as to identify any cow giving a milk sample with a high score for amyloid A.

4. In this further testing the threshold value would be set higher. Any cow which was then discovered to be giving a score greater than 4,000 would be taken out of the group and would kept out of the group until the amyloid A score for milk from that cow had once again fallen below 1,000.

The data was analysed first on the assumption that the threshold value was a score of 1,000. The exercise was then repeated setting the threshold score at only 500. It was apparent that with either threshold value, the incidences of mastitis would have been detected, although one of them would have been detected a day later with a threshold of 1,000 than with a threshold of 500.

Mixing Milk for Assay

Mixing portions of milk together prior to carrying out a biological assay on the mixture can of course be done by taking portions of milk out of the required subsamples collected by means of apparatus discussed earlier and mixing them together in another vessel.

However, a significant option is to form test volumes of mixed milk directly as the subsamples are taken out of the plugs of milk flowing past the extraction point. More specifically, it is possible to collect a plurality of mixed subsamples of milk at the extraction point by allowing the leading portion of milk from each animal to pass the extraction point and thereafter delivering subsamples of the remaining milk of that animal into a plurality of receptacles according to a scheme in which these individual receptacles receive subsamples of milk from a plurality of animals.

This could be done with the valve arrangement shown in FIGS. 16 and 17 using the transport device of FIG. 18 to position the liquid handling head incorporating the discharge valve over each of a plurality of vessels, discharging a subsample into each one. In order to give time for movement of the discharge valve from one location to the next, a valve could be provided in the pipe 77 slightly upstream of the extraction point. This valve could be closed to interrupt the movement of a plug of milk along the pipe 77 and through the extraction point while the liquid handling head was repositioned.

Another possibility is to use a valve arrangement similar to that shown in FIG. 19 using its plurality of outlet valves 230 to dispense into a plurality of receptacles, while utilising a transport mechanism to position the required receptacles under the outlet valves.

Cleaning

At the end of mincing, it is normal to clean the milking machinery using a clean-in-place routine in which wash liquors and rinse liquors are circulated through the machinery using the vacuum of the milking machinery to cause circulation of the liquors.

The apparatus of this invention can be cleaned-in-place by temporarily closing the milk exit from each of the milk meters 11. This is done with pressure operated valves 51 positioned between the milk meters and the main suction pipe 7. When these valves close, cleaning liquor which is entering each milk meter fills the milk meter and then leaves through the sample outlet 22. Each milk valve 30 is opened to allowing the cleaning liquor to flow into the holding vessel 24.

The valves 51 can all be operated simultaneously by using a valve 175 to control pressure in pipe 176. For example the valves could be held open by vacuum in pipe 176, and closed simultaneously by using valve 175 to admit air to pipe 176. The milk meters 9, milk valves 30 and holding vessels 24 will fill with cleaning liquor. They may not do so in unison, but as one fills, flow through it and out through pipes 55, 52 or 195 slows down, allowing the others to catch up.

The flow rate of washing liquid is considerably higher than that of milk from a cow, hence when the washing fluid enters a vessel 24 the tangent port of pipe 36 helps establish a rotary cleaning action within the vessel.

After sufficient time for the vessels 24 to fill, the valves 51 are re-opened to allow normal cleaning-in-place of the milking machinery to continue, the milk valves 30 are operated one at a time or simultaneously so that the vessels 24 are pressurised with compressed air, to expel the cleaning liquor from them into the flowpath 64,74,77 and out through the extraction point 80 and the pressure reducing valve 78. As cleaning liquor flows along the flowpath through the extraction point 80, the various valves at the extraction point are also operated in the same manner as used for the extraction of milk samples so as to ensure that cleaning liquor passes through all the passages and valves of the extraction point 80.

Pipes 52 and 55 or 195 are cleaned by the flow described above. Pipe 56 is cleaned by flow which results from closing the mushroom valve. Pipe 57 can be cleaned by admitting cleaning fluid through a valve 226 (FIG. 2) close to the compressor 60. This fluid is drawn into pipe 57 by opening valves 75 and 58 as required and drawing the liquid through with the vacuum maintained in milk valve 30. Once the pipes contain cleaning fluid, the valve 226 can be switched back and the fluid can be pushed out with air from the compressor 60.

Control

The apparatus described above is operated by an automatic controller which operates the valves 54,58,130,140,142,175, 226 and the stepper motors 164,168 of the transport mechanism at appropriate times, either on receipt of input signals or with a predetermined delay after receiving an input signal. For example, when the leading edge of a plug of milk passes the sensor the valves 140,142 would be operated to allow the leading portion of the plug of milk to pass the extraction point, and then after a predetermined delay, operated to direct flow through the filter 136.

Inputs to the controller are

1) A signal that mincing of a cow at a milking position has begun. This could be given manually by the cowman pressing a button, or given by a switch connected to a control valve used to connect a cluster of teat cups to the vacuum system, or given by an electronic milk meter or an automatic cluster removal (ACR) device detecting the start of the flow of milk.
2) A signal that milking of the cow has finished. This could be given manually but is likely to be taken from an electronic milk meter (if used) or an automatic cluster removal (ACR) device used to remove the teat cups at the end of milking.
3) Signals from the sensor detecting the presence or absence of liquid in the pipe.

The controller may also receive signals which identify the cows at the milking positions. Such information could be keyed in, or come from existing equipment such as from sensors which read ear tags.

This controller could be a programmable logic controller, with input connections able to receive the above input signals and output channels supplying electrical power to operate the valves and the steppe motors of the transport mechanism. The stored program of a logic controller is generally held in a programmable, read only memory.

Alternatively, the controller could be a general purpose computer, with additional circuit boards to receive input signals and supply output power. In this case the operating program could be on a hard drive, floppy disk or CD ROM.

Milk Yield

A further feature of the apparatus described above is that it can be utilised in obtaining a measurement of milk yield, if the flow dividing part 9 of a manual milk meter is used at each milking position. Because these divide off a fixed proportion of the overall milk yield, which is collected and sent along the flowpath to the extraction point 80, a measurement of the weight or volume of a plug of milk will enable the overall milk yield of that cow to be calculated.

One possibility is to put an electronic milk meter downstream of the extraction point. That would then allow the (single) electronic meter to receive and measure milk from every cow. Another possibility is to use the sensor 82 to measure the time taken for a plug of milk to pass the sensor. The time for a plug of milk to pass the sensor 82 will be dependant on its volume and features of the apparatus including the (known) length of travel from the vessel 24 to the sensor 82. It would therefore be possible to calibrate the apparatus in situ, once only or at infrequent intervals, to determine a look-up table (or a graph) of volume against time taken to pass the sensor.

A further possibility is to measure speed of flow in the pipe 78, using a flow meter such as mag-meter as mentioned above, as well as measuring time for a plug of milk to pass the flow meter, and calculate the volume of the plug from this information.

The calculations would, desirably, be done automatically by the controller in accordance with part of its stored program.

Estimation of the volume of a plug of milk can also be utilised in collecting sub-samples of desired volume. If the valve 130 shown in FIGS. 16 and 17 is operated repeatedly to accumulate a sub-sample from the plug of milk as it flows past the extraction point, the size of the sub-sample will depend on the number of times the valve 130 is operated and the duration of each operation. If the valve is simply operated for a fixed duration at regular intervals until the plug of milk has passed, the sub-samples will vary in volume, depending on the volume (and hence length) of the plug of milk. This may be acceptable. However, another possibility is to position the sensor 82 further upstream from the extraction point so that a plug of milk passes the sensor 82 before its leading end arrives at the extraction point 80. Then, by the time that the valve 130 must be operated to start accumulating a sub-sample, the controller will have been able to estimate the size of the plug of milk and can adjust the operation of valve 130 to accumulate a sub-sample of predetermined size. In order to be able to accommodate the largest expected plug of milk between the sensor 82 and the extraction point 80, it may be necessary to lengthen the pipe 77, for example by putting a loop in the pipe between the sensor 82 and the extraction point 80.

Further Embodiment

Figure 20:
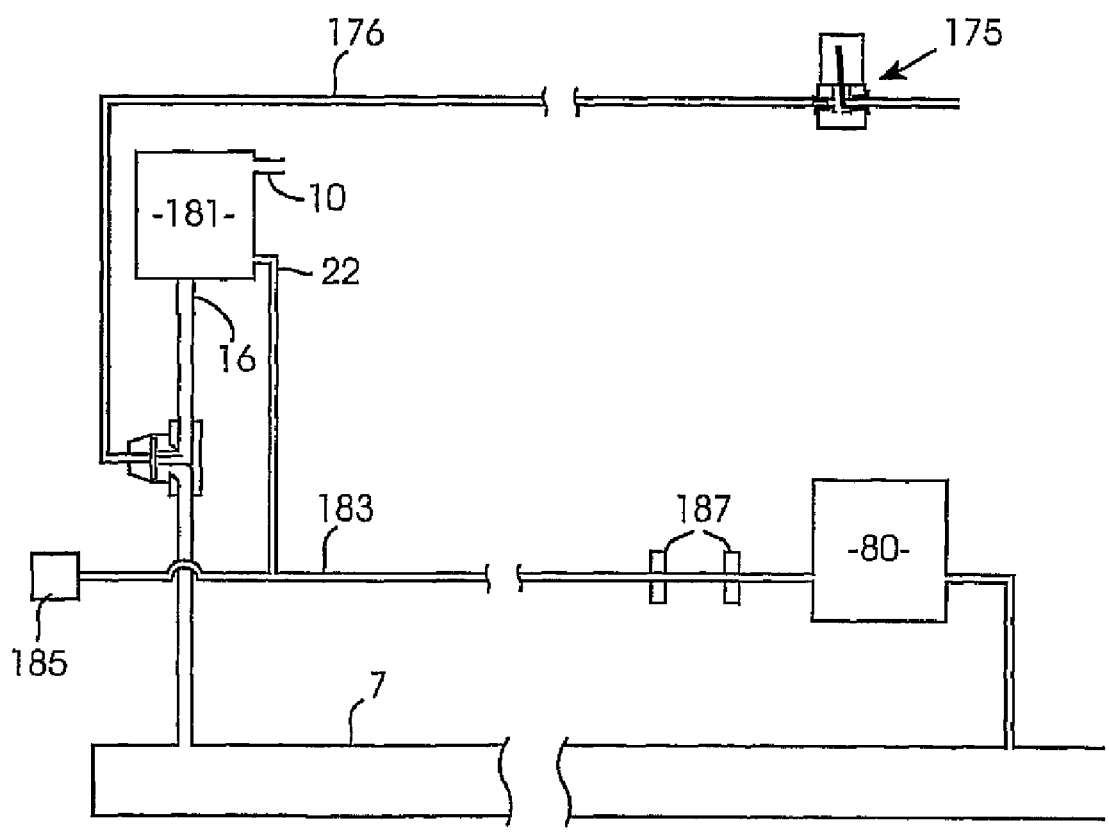
FIG. 20 is a general arrangement diagram of apparatus of this invention added to a single stall robotic milking machine.

FIG. 20 shows apparatus of the invention fitted to a single stall robotic milking machine. This provides a single milking position. The flow of milk from a cow is directed through an electronic milk meter 181 having a milk inlet 10 connected by a vacuum hose to a cluster of teat cups, a main outlet 16 connected to suction line 7 and a sample outlet 22. This separates a fixed proportion of the overall flow, which passes directly from the sample outlet 27 into a flowpipe 183, leading to an extraction point 80.

There is no milk valve 30, nor holding vessel 24. The flowpipe 183 is maintained under vacuum and milk flows onwards from the extraction point 80 back into the main suction line 7. An air bleed into the flowpipe 183 is provided at 185. A non return valve (not shown) is located in pipe 22 and air is bled into pipe 22 to force the sample of milk out of the pipe and into the sample pot.

The valve arrangement at the extraction point is generally as shown in FIG. 15, but includes additional valves to isolate, and then admit atmospheric air above, the U shaped passage 102,104,94 before opening valve 93 to discharge the sub-sample.

Because there is no holding vessel 24, milk from one cow will flow along pipe 183 as a succession of small plugs.

In place of sensor 82 there are two sensors 187 spaced slightly apart (or better still a flow meter such as a mag-meter}. The controller uses these to ensure that a sufficiently large quantity of milk from the first plug or first few plugs of milk passes the extraction point 80 before any sub-sample is taken.

Although the apparatus shown in FIG. 20 does not include a holding vessel, it would be preferred to include one for example as shown by portion 8U of FIG. 2 or as shown in FIG. 9 so that the milk flowing to the extraction point can be formed into a controlled long plug rather than arriving as a random sequence of smaller plugs.

The invention claimed is:

1. A method of identifying a number X of animals (which number X may be one or more than one) at least one of which has a predetermined substance from within a larger overall number Y of milking animals, comprising:
a step of mixing milk from pluralities of animals together which are first subsets of the overall number such that every animal is included in at least one first subset, to form first test volumes of mixed milk each associated with a said first subset;
one or more further steps of mixing milk from one or more other pluralities of animals each of which is a further subset of the overall number, to form one or more further test volumes of mixed milk each associated with a further subset, such that each further subset includes at least one animal of a said first subset but is not identical to that first subset,
testing each of the test volumes for the presence of a substance at a concentration greater than a threshold value, the allocation of animals and their milk to first and further subsets being such that identification of the number X of animals, at least one of which contains said substance is accomplished through a total number of tests which is less than the overall number Y divided by the number X.

2. A method according to claim 1 which is a method of identifying an individual animal with mastitis.

3. A method according to claim 1 which is a method of identifying an individual animal with mastitis and the method includes a final step of testing the milk of a number of individual animals which is less than the overall number.

4. A method according to claim 1 in which any test volume made by mixing milk from different animals contains a similar volume from each animal, such that the smallest volume from any one animal is at least 50% of the largest volume from any one animal.

5. An automatic machine for use in performing the method of claim 1 having means for taking subsamples from previously collected samples of milk and mixing subsamples together in accordance with a predetermined plan, so as to form volumes of mixed milk for testing, each associated with a subset of the overall number of animals under control of a stored program.

6. A machine according to claim 5 which also has means for subjecting each of the volumes of mixed milk to a test for the presence of a substance indicative of mastitis.

7. A machine according to claim 5 wherein means for subjecting mixed milk to a test is means for delivering a quantity of the mixed milk to a container with antibodies to the substance immobilised therein, and thereafter adding reagents serving to detect any substance bound to the immobilised antibodies, all under control of the stored program.

8. A machine according to claim 5 which also includes means to read the test results and then take and mix further subsamples from selected previously collected samples of milk to form further volumes of mixed milk in accordance with a predetermined response to the results of tests already performed.

9. A machine according to claim 5 which includes means to read test results and output an indication of the test results, for example to a printer or monitor.

10. A method of identifying an animal with mastitis within an overall number of milking animals, comprising:
   a step of mixing milk from pluralities of animals together which are first subsets of the overall number such that every animal is included in at least one first subset, to form first test volumes of mixed milk each associated with a said first subset;
   one or more further steps of mixing milk from one or more other pluralities of animals each of which is a further subset of the overall number, to form one or more further test volumes of mixed milk each associated with a further subset, such that each further subset includes at least one animal of a said first subset but is not identical to that first subset,
   testing each of the test volumes for a substance indicative of mastitis and optionally also testing milk of some individual animals for a substance indicative of mastitis, the allocation of animals and their milk to first and further subsets being such than an individual animal with mastitis is identified with a total number of tests which is less than the overall number of animals.

11. A method according to claim 10 wherein each subset in which mastitis is detected is notionally divided into smaller subsets which are each a subset of one of the first subsets and mixed milk from these smaller subsets is tested.

12. A method according to claim 10 wherein the first subsets are mutually exclusive.

13. A method of identifying an animal with mastitis within an overall number of milking animals, comprising:
   a step of mixing milk from pluralities of animals which are first subsets of the overall number such that every animal is included in at least one first subset, to form first test volumes of mixed milk each associated with a said first subset;
   one or more further steps of mixing milk from one or more other pluralities of animals each of which is a further subset of the overall number, to form one or more further test volumes of mixed milk each associated with a further subset, such that each further subset includes at least one animal of a said first subset but is not identical to that first subset,
   testing each of the test volumes for a substance indicative of mastitis and optionally also testing milk of some individual animals for a substance indicative of mastitis, the allocation of animals and their milk to first and further subsets being such than an individual animal with mastitis is identified with a total number of tests which is less than the overall number of animals,
   wherein the overall number of animals is also notionally subdivided to create a collection of second subsets different from the first subsets and such that each animal is included in at least one second subset, milk of the animals in each second subset is mixed to form second test volumes of mixed milk each associated with a said second subset, milk from the first and second test volumes is tested and an affected animal is identified by observing which animal is included in both a first and a second subset which have tested positive for the substance indicative of mastitis.

14. A method of identifying an animal with mastitis within an overall number of milking animals, comprising:
   a step of mixing milk from pluralities of animals which are first subsets of the overall number such that every animal is included in at least one first subset, to form first test volumes of mixed milk each associated with a said first subset;
   one or more further steps of mixing milk from one or more other pluralities of animals each of which is a further subset of the overall number, to form one or more further test volumes of mixed milk each associated with a further subset, such that each further subset includes at least one animal of a said first subset but is not identical to that first subset,
   testing each of the test volumes for a substance indicative of mastitis and optionally also testing milk of some individual animals for a substance indicative of mastitis, the allocation of animals and their milk to first and further subsets being such than an individual animal with mastitis is identified with a total number of tests which is less than the overall number of animals,
   wherein the overall number of animals is notionally subdivided to create a collection of second subsets different from the first subsets and such that each animal is included in at least one second subset, and also a collection of third subsets different from the first and second subsets and such that each animal is included in at least one third subset, milk of the animals in each second and each third subset is mixed to form second and third test volumes of mixed milk each associated with a second or third subset, milk from the first, second and third test volumes is tested and an affected animal is identified by observing which animal is included in first, second and third subsets which have tested positive for the substance indicative of mastitis.

* * * * *